United States Patent [19]

Obata et al.

[11] Patent Number: 5,378,565
[45] Date of Patent: Jan. 3, 1995

[54] FROST IMAGE RECORDING MEDIUM AND METHOD OF AND APPARATUS FOR FORMING AND READING FROST IMAGE

[75] Inventors: Hiroyuki Obata; Minoru Utsumi; Masayuki Iijima; Masato Okabe; Hironori Kamiyama, all of Tokyo, Japan

[73] Assignee: Dai Nippon Printing Co., Ltd., Tokyo, Japan

[21] Appl. No.: 741,505

[22] PCT Filed: Nov. 29, 1990

[86] PCT No.: PCT/JP90/01550
§ 371 Date: Jul. 29, 1991
§ 102(e) Date: Jul. 29, 1991

[87] PCT Pub. No.: WO91/08521
PCT Pub. Date: Jun. 13, 1991

[30] Foreign Application Priority Data

| Nov. 29, 1989 | [JP] | Japan | 1-311489 |
| Nov. 29, 1989 | [JP] | Japan | 1-311490 |
| Nov. 30, 1989 | [JP] | Japan | 1-312779 |
| Dec. 5, 1989 | [JP] | Japan | 1-315957 |
| Dec. 28, 1989 | [JP] | Japan | 1-342249 |
| Jun. 14, 1990 | [JP] | Japan | 2-156239 |

[51] Int. Cl.$^6$ .............................. G03G 5/022
[52] U.S. Cl. .................................. 430/50
[58] Field of Search ........................... 430/50

[56] References Cited

U.S. PATENT DOCUMENTS

| 3,973,957 | 8/1976 | Montgomery | 430/50 |
| 3,973,958 | 8/1976 | Bean | 430/50 |

*Primary Examiner*—John Goodrow
*Attorney, Agent, or Firm*—Dellett and Walters

[57] ABSTRACT

An electrode 2c and a pinene polymer recording layer 2a with a molecular weight of 500 to 10000 are successively stacked on a substrate 2c, as shown in FIG. 3. By carrying out thermal development, information electric charge that is formed on the resin surface is formed into a thermally stable frost image without decay of the information electric charge. Since no photoconductive layer is needed, when transmitted or reflected light is used to reproduce the frost image, there is no effect of the coloring of a photoconductive layer. If exposure is effected under the application of a voltage, since the depth of dimple patterns of a frost image varies in accordance with the quantity of exposure energy, tonal reproducibility is obtained. In addition, it is possible to obtain high resolution and make an original for OHP, a microfilm, a slidefilm, etc. which is of good quality and has high fidelity to the original document.

4 Claims, 22 Drawing Sheets

Information recording medium

Information recording medium for forming frost image

FIG. 32(c)     FIG. 32(d)     FIG. 32(e)
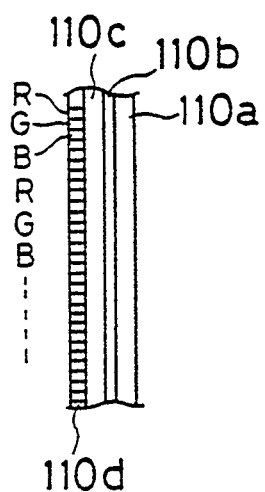 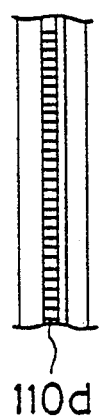 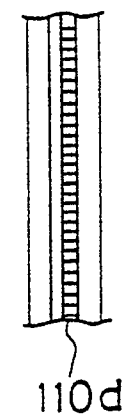
FIG. 32(f)     FIG. 32(g)     FIG. 32(h)
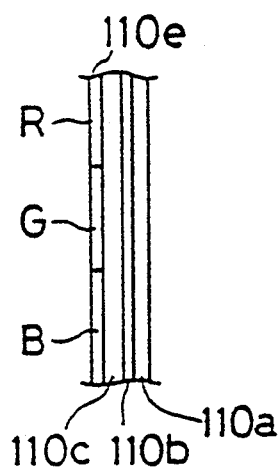 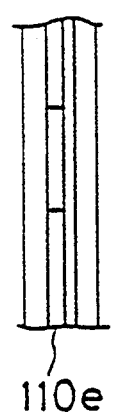 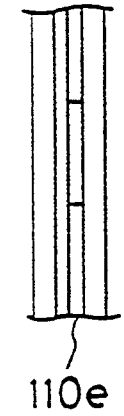

FROST IMAGE RECORDING MEDIUM AND METHOD OF AND APPARATUS FOR FORMING AND READING FROST IMAGE

TECHNICAL FIELD

The present invention relates to an information recording medium for forming a frost image on a thermoplastic resin layer, a method of forming a frost image on the information recording medium, a method of optically reading the frost image thus formed, and an apparatus for making an original for an overhead projector (OHP), a microfilm, a transmission slidefilm, etc. from a frost image.

BACKGROUND ART

There has heretofore been a conventional information recording medium of the type in which the surface of a thermoplastic resin layer is charged by means of an electron beam in a vacuum to store information electric charge thereon and, after the charging, the thermoplastic resin layer is softened by heating to form on the surface thereof a frost image comprising dimple patterns corresponding to the quantity of electric energy stored thereon.

However, most conventional apparatuses designed to effect image formation in a vacuum are large in size and have difficulty in forming a frost image, depending on the type of thermoplastic resin used.

In the meantime, recording media that need no vacuum system are also known, for example, a thermoplastic recording medium that comprises a photoconductive layer and a thermoplastic resin layer, which are successively stacked on an electrode, and a thermoplastic recording medium comprising a single layer having both thermoplasticity and photoconductivity. There has also been a known method of recording information on such thermoplastic recording media, wherein, after a thermoplastic recording medium is subjected to initial overall charging by corona charging, for example, image exposure is effected, and the medium is fully charged again and then developed by heating or in a solvent vapor, thereby forming a frost image corresponding to the image exposure.

According to this developing method, a photoconductive member 10, which comprises an electrode 10b and a thermoplastic resin layer 10a that are formed on a substrate 10c, is uniformly charged by corona charging with a charger 11, as shown exemplarily in FIG. 1(a). Then, image exposure is effected to form an electrostatic charge pattern corresponding to the image, as shown in FIG. 1(b). Thereafter, the photoconductive member is heated with a heater 12, with the electrode 10b grounded, as shown in FIG. 1(c). In consequence, the thermoplastic resin layer 10a is plasticized, and the electric surface charge and the electric charge of the opposite sign that is induced on the electrode 10b in correspondence to the electrostatic charge pattern attract each other. As a result, a dimple pattern image 10d, that is, a frost image, is formed on the surface of the thermo-plastic resin layer, as shown in FIG. 1(d). After the formation of the frost image, the photoconductive member is cooled to fix the dimple pattern image, thus enabling development of the electrostatic charge pattern.

However, the conventional developing method shown in FIGS. 1(a)-1(d) is inferior in the electric charge retaining performance because the electrostatic latent image is formed on the photoconductive member.

In addition, the recording medium that has a photoconductive layer needs an operation of effecting overall charging by, for example, corona charging, to perform recording.

Further, the conventional developing method shown in FIGS. 1(a)-1(d) cannot always obtain satisfactorily deep dimple patterns and hence cannot increase the density range.

In addition, the frost image cannot be formed unless the potential of the electrostatic latent image is higher than a predetermined level V1, and it is saturated at a voltage higher than a predetermined level V2. Thus, the tonal reproducibility is restricted within a predetermined potential range. In the meantime, the surface potential of an information recording medium shows characteristics relative to the exposure energy, such as those shown in FIGS. 2(a)-2(d). Thus, a frost image is formed within a surface potential range of from V1 to V2, and the tonal reproducibility is obtained only within this range. The range is determined by the kind of resin material used and the film thickness, and it is independent of the characteristics of the photosensitive member used. Accordingly, a frost image can be formed only within the range of exposure energy J that is defined as $J1 \leq J \leq J2$. Thus, the tonal reproducibility is undesirably fixed in a narrow range.

When a frost image is formed from an electrostatic charge pattern that is formed on an information recording medium of high insulation quality and with a thermoplastic resin layer, this frost image can be visually observed by transmission or reflection of light. However, if the frost image is extremely fine, it is difficult to read it with high accuracy, and it has therefore been demanded to develop a reading method which makes full use of the high resolution of the frost image.

Incidentally, when an explanation of a material needs to be made to a large number of people, the use of an OHP is convenient and also advantageous in terms of cost because a troublesome operation must be conducted in order to prepare a number of copies of the material which corresponds to the number of people. An original for OHP has heretofore been made by reproducing an original document on an OHP film by toner development using a copying machine.

In the making of an OHP original by use of a copying machine that performs toner development, the resolution is limited by the particle size of the toner, so that it is difficult to make an original of high resolution. In addition, when the toner image on a photosensitive drum of the copying machine is transferred to an OHP film by thermal fusion, a resin material, which is used as a film material, causes sagging on heating, so that it has heretofore been difficult to make an OHP original of good quality.

Microfilms, transmission slidefilms and so forth are generally made by use of silver halide photography, diazonium salt electrophotography, toner development, etc. In any of these methods, however, the developing process is carried out in an off-line manner. In the case of toner development, wet toner must be employed and hence many problems are involved, for example, a complicated apparatus, maintenance, etc.

In the conventional frost image forming method, charging is effected by exposure under voltage application to form a potential pattern in accordance with the quantity of exposure energy, thus forming dimple patterns. Considering, for example, a case where light is applied to an original document to effect exposure by use of the reflected light therefrom, black portions of the original document absorb the light, whereas white portions of it reflect the light, so that no dimple patterns are formed on portions corresponding to the black portions of the document, but dimple patterns are formed on portions corresponding to the white portions, resulting in a negative image of the document. When it is desired to obtain a positive image, reversal development must be conducted.

It is an object of the present invention to provide an information recording medium which allows image formation by a simple method and which enables formation of a frost image of high quality and high resolution.

It is another object of the present invention to provide a frost image forming method which enables a frost image with relatively deep dimple patterns and which allows enlargement of the density range in development.

It is still another object of the present invention to provide a frost image forming method which enables tonal reproducibility to be selected as desired by varying y-characteristic of the surface potential relative to the quantity of exposure energy.

It is a further object of the present invention to provide a method of optically reading a frost image, in which scanning is effected with laser light and the transmitted or reflected light is read.

It is a still further object of the present invention to provide a method and an apparatus which can prepare an OHP original of good quality and high resolution without effecting toner development.

It is a still further object of the present invention to provide an apparatus for making an original for an overhead projector, a microfilm, a transmission slidefilm, etc., which can form a positive frost image directly.

DISCLOSURE OF THE INVENTION

The present invention is an information recording medium comprising a pinene polymer recording layer having a molecular weight of 500 to 10000, which is stacked on an electrode, wherein, after an information electric charge is stored on the surface of the recording layer, the pinene polymer is heated or left in a solvent vapor, thereby forming a frost-shaped visible image corresponding to the information electric charge on the surface of the recording layer.

In addition, the present invention is characterized in that, at the time of thermal development, either an insulator or an electrical conductor, having a predetermined potential, is disposed face-to-face with a thermoplastic resin layer formed with an electrostatic charge pattern, thereby increasing the Coulomb force acting on the electrostatic charge on the surface of the thermoplastic resin layer, and thus increasing the depth of the resulting dimple patterns.

In addition, the present invention is a frost image forming method in which an information recording medium having a thermoplastic resin layer, which is disposed face-to-face with a photosensitive member having a photoconductive layer, is formed with an electrostatic latent image by exposure under voltage application and then distorted by heating to form a frost image thereon and thereafter cooled to fix the frost image, characterized in that electric charge is stored on the information recording medium in advance by pre-charging.

In addition, the present invention is a method of reading a frost image which is formed by forming distortions on a thermosoftening resin layer and then fixing the distortions by cooling, characterized by scanning the surface of the thermosoftening resin layer with laser light and reading the transmitted or reflected light.

In addition, the present invention provides a method for making an original for an overhead projector, comprising the steps of: disposing a photosensitive member having an electrically conductive layer and a photoconductive layer, which are successively formed on a substrate, face-to-face with an information recording medium and effecting image exposure with a voltage being applied between the photosensitive member and the information recording medium, thereby forming an electrostatic charge image on the information recording medium; and heating the information recording medium formed with the electrostatic charge image to form a frost image thereon. The present invention also provides an apparatus for making an original for an overhead projector, comprising: a photosensitive member having an electrically conductive layer and a photoconductive layer, which are successively formed on a substrate; an information recording medium which is disposed face-to-face with the photosensitive member; a power supply for applying a voltage between the photosensitive member and the information recording medium; an optical system for subjecting the photosensitive member to image exposure; and means for heating the information recording medium formed with an electrostatic charge image.

In addition, the present invention is characterized by comprising: a drum-shaped photosensitive member having a photoconductive layer and a spacer, which are successively stacked on a drum having an electrically conductive layer formed on the surface thereof; means for pre-charging either an information recording medium having an electrically conductive layer and a thermoplastic resin layer, which are successively stacked on a substrate, or a medium comprising the information recording medium and a spacer stacked thereon, the information recording medium being sequentially fed in such a manner that the thermoplastic resin layer comes into contact with at least a part of the drum-shaped photosensitive member; means for short-circuiting the charged information recording medium with the electrically conductive layer of the drum-shaped photosensitive member; exposure means; and means for heating the exposed information recording medium; and in that image exposure is effected in a state where the pre-charged information recording medium and the electrically conductive layer of the drum-shaped photosensitive member are short-circuited with each other, and then thermal development is effected to form a positive frost dimple pattern image.

BEST MODE FOR CARRYING OUT THE INVENTION

Figure 3:
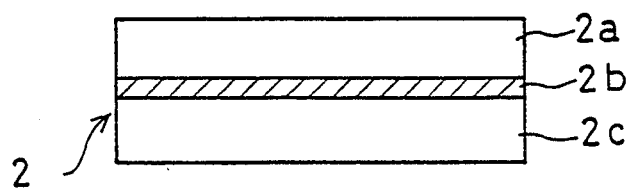
FIG. 3 is a sectional view of the information recording medium according to the present invention.

FIG. 3 is a sectional view of the information recording medium according to the present invention, in which reference numeral 2 denotes an information recording medium, 2a a pinene polymer recording layer, 2b an electrode, and 2c a substrate.

Pinene polymer is a polymer of either $\alpha$-pinene or $\beta$-pinene, which are monoterpene hydrocarbons. The pinene polymer that is usable in the present invention is either a pinene polymer obtained from $\alpha$-pinene or a polymer obtained from $\beta$-pinene, which has a molecular weight of 500 to 10000. If the molecular weight is less than 500, the required moldability cannot be obtained, whereas, if it exceeds 10000, it is difficult to form a frost image. Pinene polymers which are preferably used in the present invention have a softening point of 60° C. to 160° C.

Examples of pinene polymers obtained from $\alpha$-pinene, which are usable in the present invention, include Piccolite A-115, trade name, manufactured by Rika Hercules, Co., {softening point (ring and ball method): 115° C.; molecular weight: 800; and glass transition temperature: 64.0° C.}. Examples of usable polymers obtained from $\beta$-pinene include Piccolite S-115, trade name, manufactured by Rika Hercules, Co., (softening point: 115° C.; and molecular weight: 1700).

Such a pinene polymer is dissolved in a solvent, e.g., xylene, toluene, benzene, chloroform, dichloroethane, n-hexane, etc. and coated on an electrode by a coating method, for example, blade coating, dipping, spinner coating, etc. The film thickness of the pinene polymer after drying is preferably from 0.1 $\mu$m to 5 $\mu$m. If the film thickness is less than 0.1 $\mu$m, the required surface potential cannot be placed, or the electric charge leaks before the thermal development, whereas, if the film thickness exceeds 5 $\mu$m, no dimple pattern can be formed unless a high surface potential is placed, or crystallization of the resin occurs during the coating process, causing separation and making it impossible to perform the desired coating.

The electrode may be supported by a substrate. The electrode is formed on a substrate except that a metallic plate is used as a substrate. There is no specific restriction on the material used for the electrode as long as the resistivity is not higher than $10^6$ ohm-cm. It is possible to use an inorganic metallic conductive film, an inorganic metallic oxide conductive film, an organic conductive film, e.g., quarternary ammonium salt, and so forth.

For example, it is possible to use a transparent electrode, e.g., indium oxide-tin oxide ($In_2O_3$-$SnO_2$) (ITO) film, a tin oxide film, etc., an electrode produced by evaporating or sputtering Au, Al, Ag, Ni, Cr or the like, an organic electrode formed by coating tetracyanoquinodimethane (TCNQ), polyacetylene or the like, or a silicon substrate with the surface treated with thermal oxidation.

In particular, if a substrate that is provided with a layer which prevents the injection of inverse electric charges from the electrode, for example, a silicon substrate with a thermally oxidized surface, is used as an electrode of the information recording medium, the thickness of the pinene polymer recording layer can be reduced and it is possible to obtain a frost image of higher quality and higher resolution.

There are no specific restrictions on the thickness and material of the substrate, provided that it is sufficiently strong to support the information recording medium. For example, a flexible plastic film or a glass or plastic sheet, which has a thickness of about 1 mm, is used.

A method of recording electrostatic information on the information recording medium of the present invention will next be explained with reference to FIGS. 4(a)–4(d).

Figure 4:
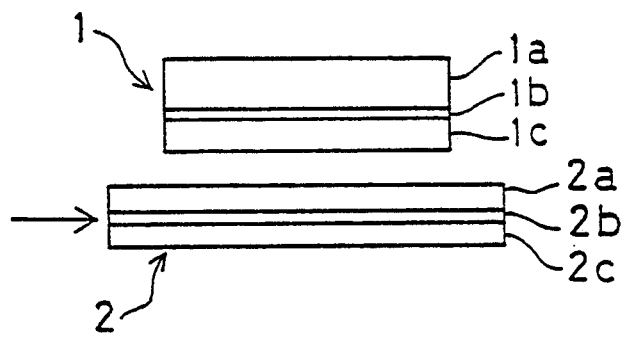
FIGS. 4(a)–4(d) are views for explanation of a method of forming an electrostatic latent image on the information recording medium of the present invention.
Figure 4:
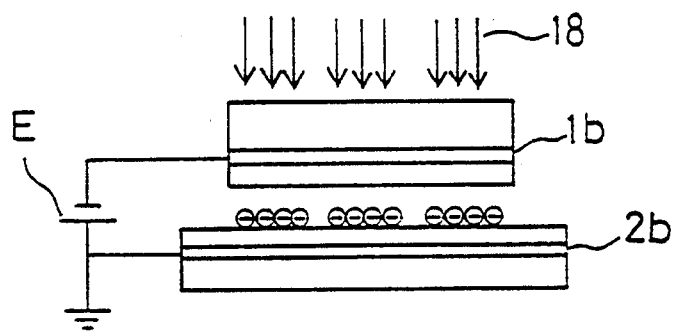
Figure 4:
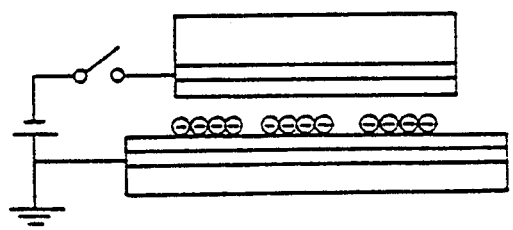
Figure 4:
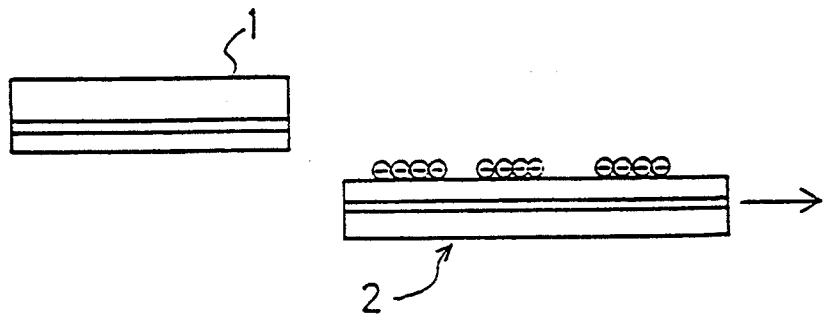

To record information on the information recording medium of the present invention, a photosensitive member having an photoconductive layer, e.g., an a-selenium layer or an organic photoconductive layer, which is stacked on an electrode, is used. As shown in FIG. 4(a), a photosensitive member 1, which is formed by stacking indium oxide-tin oxide (ITO) electrode 1b of 1000 Å thick on a glass substrate 1a of 1 mm thick and further stacking a photoconductive layer 1c of about 10 $\mu$m thereon, is disposed face-to-face with an information recording medium 2 across an air gap of about 10 $\mu$m.

Next, a voltage is applied between the electrodes 1b and 2b from a power supply E, as shown in FIG. 4(b). If the photosensitive member 1 and the information recording medium 2 are placed in the dark, since the photoconductive layer 1c is a highly resistive element, no change occurs between the electrodes as long as the voltage applied across the air gap is lower than the discharge initiating voltage according to Paschen's law.

When information light is applied from the photosensitive member side, regions of the photoconductive layer 1c where the information light is incident become electrically conductive, inducing an electric discharge, and thus allowing information electric charge to be stored on the information recording layer.

Then, the power supply E is turned off, as shown in FIG. 4(c), and the information recording medium 2 is separated from the photosensitive member 1 (FIG. 4(d)).

Next, the information recording medium with the information electric charge stored on the surface thereof is heated to thereby form a frost image on the surface in accordance with the stored electric charge.

Preferably, the heating process is carried out by resistance heating or by use of a heating means, for example, an oven.

The heating temperature or heating time depends on the kind of the resin used and the softening point thereof. With regard to the heating temperature, particularly, if the heating temperature is higher than the temperature at which the resin is completely softened, the electric charge decays, so that no electrostatic force acts and dimple patterns once developed disappear due to the leveling effect. Accordingly, it is preferable to carry out heating at a temperature a little lower than the softening point of the resin used.

For example, when the pinene polymer recording layer is made of a $\beta$-pinene polymer whose softening point is 115° C., heating is preferably carried out for 1 to 3 minutes at a temperature of from 90° C. to 110° C., more preferably from 95° C. to 100° C. If the heating temperature is less than 90° C., the resin will not soften to form a satisfactory frost image, whereas, if the heating temperature exceeds 110° C., the viscosity of the resin becomes excessively low, so that the image is blurred or the erasure of the image takes place undesirably at the same time. In addition, an excessively long heating time is not preferable because the image is also blurred due to the fluidity of the softened resin.

It is also possible to form a frost image by leaving the information recording medium formed with the electrostatic latent image in a hermetically sealed container filled with a solvent vapor, e.g., xylene, acetone, methyl ethyl ketone, toluene, etc., instead of carrying out the thermal development.

Although in the foregoing description electrostatic information is recorded by use of a photosensitive member, recording of electrostatic information on the information recording medium of the present invention may also be effected by an electrostatic recording method that employs corona charging, an electrode stylus head or an ion beam head, or a recording method that employs an optical printer, e.g., a laser printer.

Although styrene resin, terpene resin, rosin ester, cumarone resin, polyvinyl chloride resin and so forth have heretofore been known as thermoplastic recording materials, we have found that, if a pinene polymer with a molecular weight of 500 to 10000 is used as a recording layer, the information electric charge formed on the resin surface will not decay even when the thermal development temperature is set at 90° C. to 110° C. and it is possible to form a frost image which is thermally stable in comparison to other thermoplastic recording materials. We have also found that an even more clear frost image can be obtained by setting the film thickness at 0.1 $\mu$m to 5 $\mu$m.

More specifically, the information recording medium of the present invention provides an excellent frost image even if it is not placed in a vacuum condition, and it needs no photoconductive layer to perform recording and hence makes it possible to simplify the recording method.

In addition, if information recording is effected by exposure under voltage application using a photosensitive member, the following advantages are provided:

First, since the information recording medium for forming a frost image needs no photoconductive layer as in the prior art, when transmitted or reflected light is used to reproduce the frost image, there is no effect of the coloring of the photoconductive layer, so that a transparent frost image can be provided.

Secondly, since information recording can be effected in the atmosphere, it is possible to form a frost image using a simple apparatus in comparison to the formation of a frost image by use of an electron beam.

Thirdly, it is possible to form a frost image with tonal reproducibility by adopting the method wherein exposure is effected under voltage application. Thus, a superior frost image can be obtained.

The information recording medium of the present invention, which is formed in this way, can be designed to be suitable for an original for use in an overhead projector in which projection is effected by transmission or reflection of light.

Examples of the information recording medium according to the present invention will next be explained.

EXAMPLE 1

200 g of distilled $\beta$-pinene ($\beta$-pinene manufactured by Tokyo Kasei K.K. was distilled under a reduced pressure) and 200 g of dehydrated toluene were placed in a three-neck flask with a stirrer, a cooler and a thermometer, and 10 g of anhydrous AlCl$_3$ (manufactured by Junsei Kagaku K.K.) was added thereto under stirring, thereby carrying out polymerization for 2 hours at 40° to 45° C.

Subsequently, the reaction mixture was transferred to a separatory funnel, and 100 ml of 5% hydrochloric acid aqueous solution was added thereto. After the resulting mixture was fully shaken, the upper layer was separated and washed with a 10% sodium hydroxide aqueous solution and further with water.

After drying with anhydrous calcium chloride, the solvent was removed. Then, the reaction product was dissolved in 200 ml of chloroform and thereafter reprecipitated using a large amount of methanol for purification, thereby obtaining a $\beta$-pinene polymer in a yield of 96 g (48%).

The molecular weight of this polymer was determined to be 5760 in terms of polystyrene by measurement with a high-performance liquid chromatograph HLC-802A (manufactured by Toso K.K.) using a column of SHODEX GTC-KF-800. The softening point and glass transition temperature of the polymer were determined to be 130° C. and 75° C., respectively, by thermal analysis with differential scanning thermal analytical apparatus SSC580, DSC-20 (manufactured by Seiko Instruments Inc.). It should be noted that the measurement of molecular weight, softening point and glass transition temperature in the following Examples was carried out in the same way as in this Example.

Next, a 18 wt % solution was prepared by dissolving 9 g of $\beta$-pinene polymer thus obtained in 41 g of xylene, and this solution was coated on an ITO electrode (550 Å, 80 ohm/□) evaporated on a glass substrate by use of a spin coater at 2000 rpm.

Thereafter, drying was carried out for 1 hour at 60° C. to form a $\beta$-pinene polymer film of 5500 Å thick, thereby obtaining an information recording medium according to the present invention.

This information recording medium and a photosensitive member having an organic photoconductive layer stacked on a transparent electrode were disposed in such a manner that the recording layer and the organic photoconductive layer of the photosensitive member face each other across an air gap defined by a polyester film of 9 μm thick used as a spacer, as shown in FIGS. 4(a)–4(d).

Next, image exposure was effected from the photosensitive member side and, at the same time, 700 V was applied for 1.0 sec. between the respective electrodes of the recording medium and the photosensitive member with the photosensitive member electrode used as a negative electrode, thereby forming an electrostatic latent image on the medium. Thereafter, heating was carried out for 3 minutes in an oven at 95° C., thereby obtaining a frost image with clearly discernible patterns. The frost frequency of the frost image obtained was determined to be about 450 cycles/mm by observation with a microscope (with a magnifying power of 1000).

It should be noted that the term "frost frequency" is herein employed to mean the number of cycles per mm, one cycle being defined by each pair of adjacent projections or recesses, which constitute dimple patterns formed by the development, measured by observation with a microscope.

The frost frequency mentioned hereinafter was measured in the same way as the above.

EXAMPLE 2

100 g of distilled $\alpha$-pinene ($\alpha$-pinene manufactured by Tokyo Kasei K.K. was distilled under a reduced pressure) and 200 g of dehydrated toluene were placed in a three-neck flask with a stirrer, a cooler and a thermometer, and 5 g of anhydrous $AlCl_3$ (manufactured by Junsei Kagaku K.K.) was added thereto under stirring, thereby carrying out polymerization for 2 hours at 40° to 45° C.

Subsequently, the reaction mixture was transferred to a separatory funnel, and 50 ml of 5% hydrochloric acid aqueous solution was added thereto. After the resulting mixture was fully shaken, the upper layer was separated and washed with a 10% sodium hydroxide aqueous solution and further with water.

After drying with anhydrous calcium chloride, the solvent was removed. Then, the reaction product was dissolved in 100 ml of chloroform and thereafter reprecipitated using a large amount of methanol for purification, thereby obtaining an $\alpha$-pinene polymer (softening point: 110° C.; and molecular weight: 600) in a yield of 12 g (12%).

Next, with the obtained $\alpha$-pinene polymer used, an $\alpha$-pinene polymer film of 5500 Å thick was formed in the same way as in Example 1, thereby obtaining an information recording medium according to the present invention.

After an electrostatic latent image was formed on the medium thus obtained in the same way as in Example 1, heating was carried out for 3 minutes in an oven at 95° C., thereby obtaining a frost image with clearly discernible patterns, which was similar to that obtained in Example 1.

EXAMPLE 3

A 18 wt % solution was prepared by dissolving 9 g of $\beta$-pinene polymer (Piccolite S-115, trade name, manufactured by Rika Hercules, Co.; softening point: 115° C.; and molecular weight: 1710) in 41 g of xylene, and this solution was coated on an ITO electrode (550 Å, 80 ohm/□) evaporated on a glass substrate by use of a spin coater at 2000 rpm.

Thereafter, drying was carried out for 1 hour at 60° C. to form a $\beta$-pinene polymer film of 5500 Å thick, thereby obtaining an information recording medium according to the present invention.

After an electrostatic latent image was formed on the medium thus obtained in the same way as in Example 1, heating was carried out for 3 minutes in an oven at 95° C., thereby obtaining a frost image with clearly discernible patterns. The frost frequency of the frost image obtained was determined to be about 450 cycles/mm by observation with a microscope (with a magnifying power of 1000).

The relationship between the heating temperature and the amount of decay of the surface potential in the information recording medium thus produced was measured in the relation of the quantity of thermally stimulated current to the heating temperature with a thermally stimulated current measuring device (manufactured by Toyo Seiki K.K.).

Figure 5:
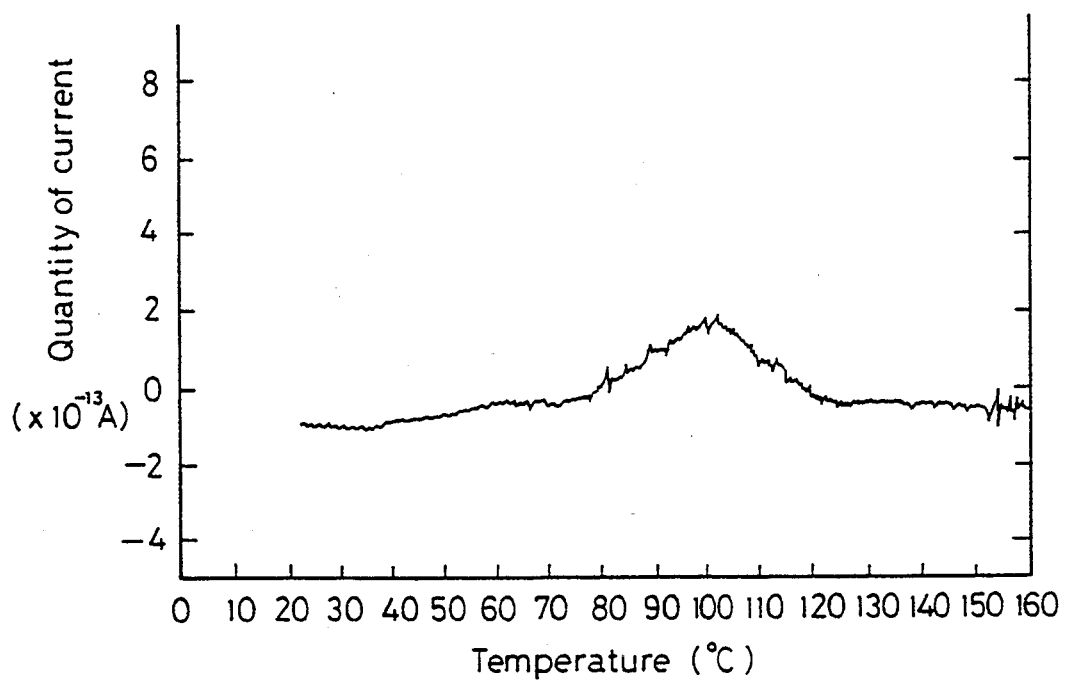
FIG. 5 is a graph showing the results of measurement of the thermally stimulated current in the information recording layer of the present invention.

FIG. 5 shows the results of the measurement. It will be understood from the figure that the information recording medium of the present invention retains a sufficiently high potential to perform development at a high temperature of 90° C. to 110° C.

EXAMPLE 4

In place of the $\beta$-pinene polymer used in Example 3, $\alpha$-pinene polymer (Piccolite A-115, trade name, manufactured by Rika Hercules, Co.; softening point: 115°

C.; and molecular weight: 833) was used to prepare a solution, which was then coated on an ITO electrode (550 Å, 80 ohm/□) evaporated on a glass substrate by use of a spin coater at 1000 rpm in the same way as in Example 3.

Thereafter, drying was carried out for 1 hour at 60° C. to form an α-pinene polymer film of 8000 Å thick, thereby obtaining an information recording medium according to the present invention.

After an electrostatic latent image was formed on the medium thus obtained in the same way as in Example 1, heating was carried out for 3 minutes in an oven at 100° C., thereby obtaining a frost image with a frost frequency of about 400 cycles/mm.

EXAMPLE 5

An information recording medium of the present invention was produced in the same way as in Example 3 except that a β-pinene polymer solution was coated at 1000 rpm by use of a spin coater and drying was carried out for 1 hour at 60° C. to form a β-pinene polymer film of 8500 Å thick.

After an electrostatic latent image was formed on the medium thus obtained in the same way as in Example 1, heating was carried out for 3 minutes in an oven at 95° C., thereby obtaining a frost image with a frost frequency of about 400 cycles/mm.

EXAMPLE 6

With the medium produced in Example 3, an electrostatic latent image was formed thereon in the same way as in Example 1. Thereafter, the information recording medium was left for 5 minutes in a hermetically sealed container heated at 60° C. and filled with xylene vapor, thereby obtaining a frost image on the medium in the same way as in Example 3.

EXAMPLE 7

A 18 wt % solution, which was prepared by dissolving 9 g of β-pinene polymer (Piccolite S-115, trade name, manufactured by Rika Hercules, Co.; softening point: 115° C.; and molecular weight: 1710) in 41 g of xylene, was coated by use of a spin coater at 4000 rpm on the thermally oxidized surface of a silicon substrate obtained by cutting a silicon crystal with a resistivity of 1 to 100 ohm-cm, which was produced by Czochralski method with phosphorus doped therein, along (1.0.0) plane to a thickness of 600 μm.

Thereafter, drying was carried out for 1 hour at 60° C. to form a β-pinene polymer film of 3000 Å thick, thereby obtaining an information recording medium according to the present invention.

The medium thus obtained was subjected to pattern exposure, with the silicon substrate used as an electrode, in the same way as in Example 1, thereby forming an electrostatic latent image on the recording medium of the present invention.

Next, heating was carried out for 3 minutes in an oven at 95° C., thereby obtaining a frost image with clearly discernible patterns. The frost frequency of this frost image was determined to be about 550 cycles/mm by observation with a microscope (with a magnifying power of 1000).

It will be understood that the information recording medium obtained in this Example has a higher resolution than that of the information recording medium in Example 3.

When charging was similarly effected on an information recording medium with the same arrangement as that in Example 3 except that the film thickness of the β-pinene polymer was 3000 Å, the charged potential decayed immediately, so that no frost image was obtained.

Comparative Example 1

100 g of distilled β-pinene (β-pinene manufactured by Tokyo Kasei K.K. was distilled under a reduced pressure) and 100 g of dehydrated toluene were placed in a three-neck flask with a stirrer, a cooler and a thermometer, and 1 g of $BF_3$ $(ET)_2O$ (manufactured by Junsei Kagaku K.K.) was added dropwise thereto under stirring in a state where the temperature was maintained at 0° C. thereby carrying out polymerization for 2 hours.

Subsequently, the reaction mixture was transferred to a separatory funnel, and 100 ml of 5% hydrochloric acid aqueous solution was added thereto. After the resulting mixture was fully shaken, the upper layer was separated and washed with a 10% sodium hydroxide aqueous solution and further with water.

After drying with anhydrous calcium chloride, the solvent was removed. Then, the reaction product was dissolved in 50 ml of chloroform and thereafter reprecipitated using a large amount of methanol for purification, thereby obtaining a β-pinene polymer (softening point: 59° C.; and molecular weight: 480) in a yield of 30 g (30%).

Next, with the obtained β-pinene polymer employed, a β-pinene polymer film of 5500 Å thick was formed in the same way as in Example 1, thereby obtaining an information recording medium.

An electrostatic latent image was formed on the medium thus obtained in the same way as in Example 1. However, the latent image rapidly decayed, so that it was impossible to charge the medium.

Comparative Example 2

In place of the thermoplastic resin material, i.e., β-pinene polymer, in Example 3, an α-methylstyrene polymer (Kristalex 1120, trade name, manufactured by Rika Hercules Co.; softening point: 120° C.; and molecular weight: 1710) was used to form an information recording medium in the same way as in Example 3. Thereafter, an electrostatic latent image was formed in the same way as in Example 1, and thermal development was effected for 5 minutes in an oven at 100° C. However, no pattern was discernible.

The measurement of the quantity of thermally stimulated current in relation to the heating temperature revealed that the surface potential completely decayed in the vicinity of the temperature at which α-methylstyrene softened.

Figure 6:
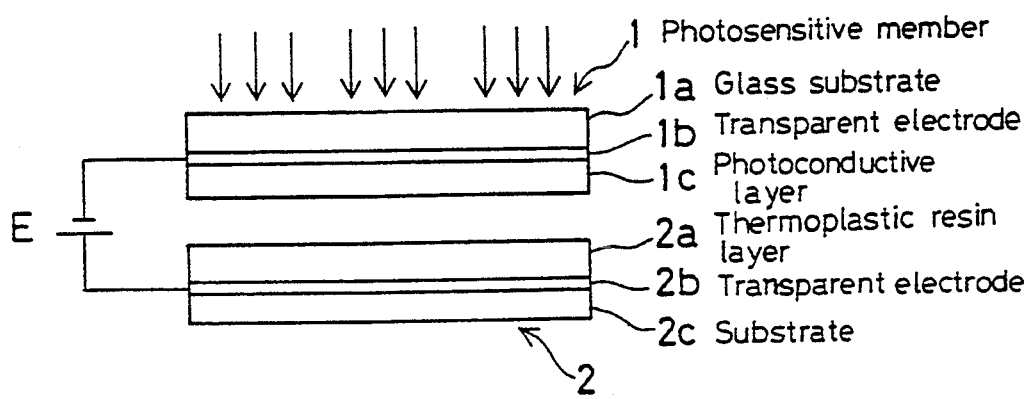
FIG. 6 is a view for explanation of a method of forming an electrostatic charge pattern.
Figure 7:
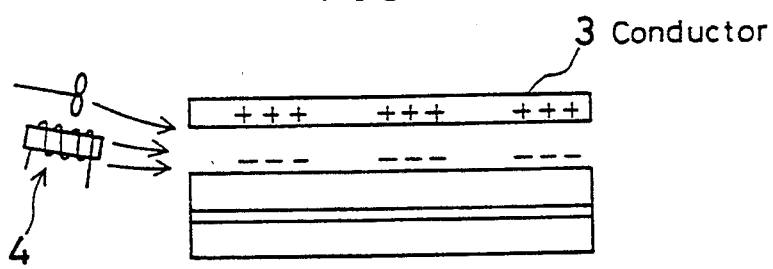
FIG. 7 is a view for explanation of thermal development.
Figure 8:
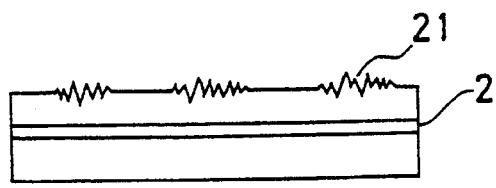
FIG. 8 is a view for explanation of a frost image formed.

FIG. 6 is a view for explanation of an electrostatic charge pattern forming method; FIG. 7 is a view for explanation of thermal development; and FIG. 8 is a view for explanation of a frost image formed. In the figures, reference numeral 1 denotes a photosensitive member, 1a a glass substrate, 1b a transparent electrode, 1c a photoconductive layer, 2 an information recording medium, 2a a thermoplastic resin layer, 2b a transparent electrode, 2c a substrate, E a power supply, 3 an electrical conductor, 4 a heater, and 21 a frost image.

The photosensitive member 1 comprises the glass substrate 1a having a thickness of about 1 mm, the transparent electrode 1b formed thereon to a thickness of 1000 Å from ITO, and the photoconductive layer formed thereon to a thickness of about 10 μm, in which areas which are exposed to light become electrically conductive. The information recording medium 2, which is disposed face-to-face with this photosensitive member across a gap of about 10 μm, comprises the substrate 2c, e.g., a glass substrate, the transparent electrode 2b formed thereon by evaporation of ITO, and the thermoplastic resin layer 2a, e.g., a rosin ester polymer, formed on the transparent electrode to a thickness of 3 to 10 μm.

When image exposure is effected with a voltage being applied between the respective electrodes of the photosensitive member and the information recording medium disposed face-to-face with each other, in the same way as described in connection with FIGS. 4(a)–4(d), the regions of the photosensitive member which are irradiated with light become electrically conductive, so that a high voltage is applied across the gap between the photosensitive member and the information recording medium, thus inducing an electric discharge. On the other hand, the regions of the photosensitive member which are not irradiated with light remain insulating. In these regions, therefore, no voltage that exceeds the discharge breakdown voltage is applied across the gap between the photosensitive member and the information recording medium and hence no electric discharge occurs. As a result, an electrostatic charge pattern in the form of the image is formed on the information recording medium.

Next, as shown in FIG. 7, the conductor 3 is disposed in opposing relation to the thermoplastic resin layer 2a formed with the electrostatic charge pattern across an air gap of 0.5 to 10 μm. In this state, heating is carried out using the heater 4 for 3 minutes at 60° C. for example, thereby softening the thermoplastic resin layer 2a. At this time, electric charge which is opposite in sign to the electric surface charge on the thermoplastic resin layer is induced on the conductor 3, and electric charge which is opposite in sign to the electrostatic charge on the surface is also induced on the electrode 2b, so that Coulomb force acts between the electrostatic surface charge on the one hand and, on the other, the electric charges induced on the electrode 2b and the conductor 3. Since in this case Coulomb foce acts between the electric charge induced on the conductor 3 and the electric charge on the thermoplastic resin layer, a frost image 21 of dimple patterns with a large depth is formed on the surface of the plasticized resin layer, as shown in FIG. 8. The dimple patterns are fixed by cooling and thus recorded as information. When light is applied to the information recording medium formed with the dimple pattern image in this way, irregular reflection occurs at the portions where the dimple patterns are formed, so that the information can be reproduced by reading whether a dimple pattern is present or not by use of the transmitted or reflected light.

For example, if light is applied to observe the transmitted light image, a portion where a frost image is formed causes irregular reflection and looks black, whereas a portion where no frost image is formed transmits the light and looks white, thus enabling observation of a positive image of the frost image. On the other hand, if light is applied to observe the reflected light image, a portion where a frost image is formed causes irregular reflection and looks white, whereas a portion where no frost image is formed transmits the light and shows the background color, thus enabling observation of a negative image of the frost image. It should be noted that the electric surface charge leaks in the heating process and the greater part of it disappears.

Although in the foregoing description the conductor 3 has a uniform surface throughout and has an area which is the same as or larger than the area of the frost image forming portion of the information recording medium 2, the conductor 3 may be formed in a pattern or provided with a dimple pattern to thereby obtain a frost image modulated by the conductor pattern or the dimple pattern.

Figure 9:
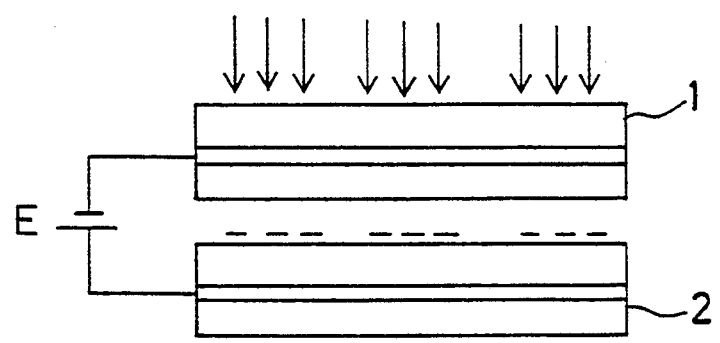
FIG. 9 is a view for explanation of the formation of an electrostatic charge pattern.
Figure 10:
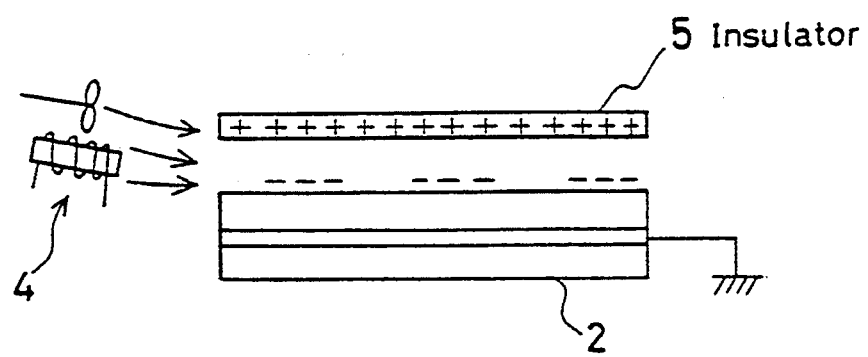
FIG. 10 shows one example in which an insulator that is stored with electric charge which is opposite in polarity to the surface electrostatic charge pattern is disposed face-to-face with the thermoplastic resin layer during thermal development.

FIGS. 9 and 10 show one example in which an insulator which is stored with electric charge opposite in polarity to the surface electrostatic charge pattern is disposed face-to-face with the information recording medium 2. In the figures, the same reference numerals as those in FIG. 6 denote the same contents. Reference numeral 5 denotes an insulator.

Referring to FIG. 9, image exposure is effected in the same way as in the case of FIG. 6, thereby forming an electrostatic charge pattern on the information recording medium 2. Next, the information recording medium is heated with the heater, as shown in FIG. 10, with the insulator 5 disposed in opposing relation to the thermoplastic resin layer 2a across a predetermined gap, the insulator 5 being uniformly stored on the surface thereof with electric charge opposite in polarity to the electrostatic charge pattern. As a result, electrical Coulomb force acts between the electric surface charge on the insulator and the electric surface charge on the thermoplastic resin layer, so that a dimple pattern image with a large depth can be formed in the same way as in the case of FIG. 7.

It should be noted that the electric charge that is formed on the insulator 5 with a polarity opposite to that of the electric charge on the thermoplastic resin layer does not necessarily need to be uniformly distributed and that it may be formed in a pattern. In such a case, the frost image is enhanced in accordance with the pattern. Accordingly, the frost image can be modulated by charging the insulator in such a manner that a portion of the frost image that is desired to enhance is stored with a relatively large quantity of electric charge of opposite polarity so as to have a relatively large potential difference, whereas a portion of the frost image that is desired to tone down has a relatively small potential difference.

Figure 11:
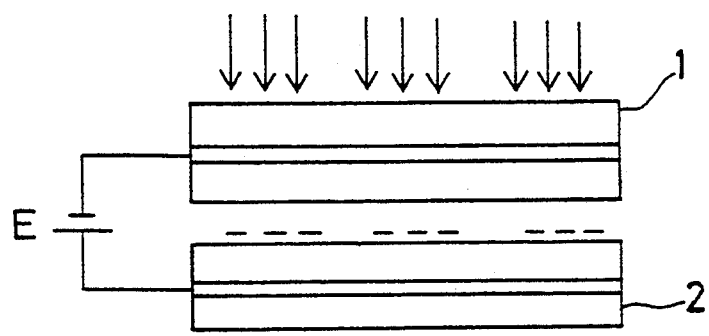
FIGS. 11 and 12 show one example in which an electrical conductor is disposed face-to-face with the surface of the thermoplastic resin layer, with a voltage being applied therebetween, during thermal development.
Figure 12:
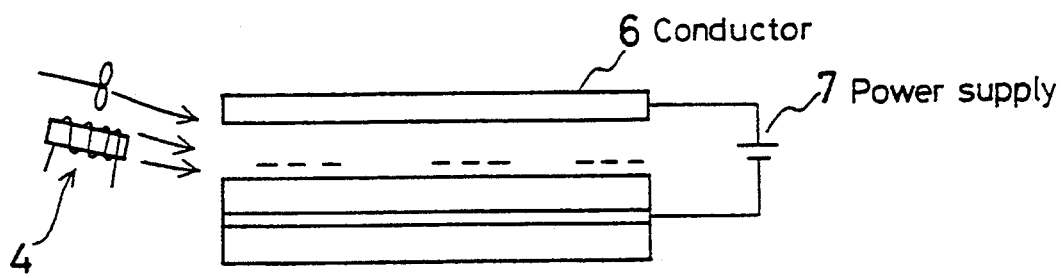

FIGS. 11 and 12 show one example in which an electrical conductor is disposed in opposing relation to the thermoplastic resin layer, with a voltage applied to the conductor. In the figures, reference numeral 6 denotes an electrical conductor, and 7 a power supply.

Referring to FIG. 11, image exposure is effected in the same way as in the case of FIG. 6, thereby forming an electrostatic charge pattern on the information recording medium 2. Next, the information recording medium is heated with the heater 4, as shown in FIG. 12, with the conductor 6 disposed in opposing relation to the thermoplastic resin layer 2a across a predetermined gap, and with a voltage being applied thereto from the power supply 7. Since a voltage is applied between the thermoplastic resin layer and the conductor from the power supply 7, the electrical Coulomb force that acts on the electric surface charge increases, so that it is possible to form a dimple pattern image with a large depth. Although the arrangement shown in FIG. 7 involves the problem that the quantity of electric charge induced on the conductor depends on the gap between the thermoplastic resin layer and the conductor and hence the depth of the frost image varies with the gap and the arrangement shown in FIG. 10 also involves the problem that the electric charge on the insulator leaks during the heating process, the arrangement shown in FIG. 12, in which a voltage is applied from the power supply 7, allows the quantity of electric charge induced on the conductor to be independent of the gap length and also makes it possible to prevent leakage of the electric charge during the heating process.

Although in this embodiment the conductor 3 has a uniform surface throughout and has an area which is the same as or larger than the area of the frost image forming portion of the information recording medium 2, it should be noted that the conductor 3 may be formed in a pattern or provided with a dimple pattern to thereby obtain a frost image modulated by the conductor pattern or the dimple pattern, in the same way as in the case of FIG. 7.

Figure 13:
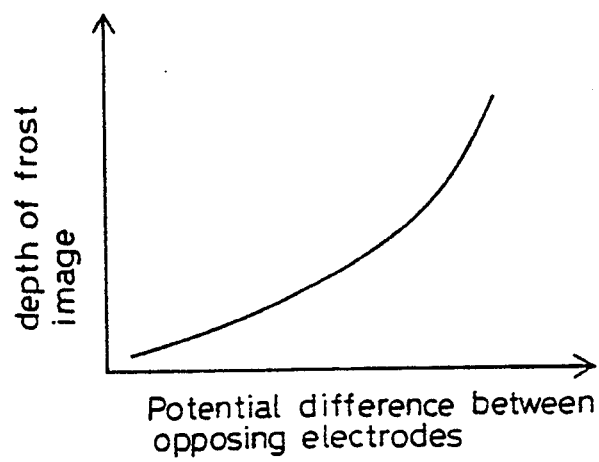
FIG. 13 is a graph showing the relationship between the opposing electrode potential difference and the depth of the frost image.

FIG. 13 is a graph showing the relationship of the depth of the frost image to the potential of the conductor in FIG. 7, the potential of the insulator in FIG. 10 and the potential difference between the opposing electrodes in FIG. 12.

As will be understood from the graph, the depth of the frost image increases in proportion to the potential difference between the opposing electrodes. Accordingly, if the potential difference between the opposing electrodes is large, it is possible to increase the depth of the dimple pattern image and hence obtain a wide density range.

Examples of the method shown in FIGS. 6 to 12 will next be explained.

EXAMPLE 8

A 50 wt % solution, which was prepared by dissolving 20 g of a rosin ester polymer (Stebelite ester 10, trade name, manufactured by Rika Hercules Co.) in 20 g of monochlorobenzene, was coated on a glass substrate of 1 mm thick having an ITO electrode evaporated thereon by use of a spin coater at 2000 rpm and then dried for about 1 hour at 60° C. to obtain a thin film of 5 μm thick.

EXAMPLE 9

A 7 wt % fluorine solution (manufactured by Asahi Glass Company, Ltd.) of fluorocarbon resin (Cytop, trade name, manufactured by Asahi Glass Company, Ltd.) was coated on a glass substrate having an ITO electrode evaporated thereon by use of a spin coater at 1500 rpm and then dried for about 1 hour at 150° C. to obtain a thin Cytop film of 2.6 μm thick.

EXAMPLE 10

The medium obtained in Example 8 and an organic photoconductive material stacked on a transparent electrode were disposed face-to-face with each other across an air gap defined by a spacer comprising a polyester film of 9 μm. Next, image exposure was effected by projecting an image from the transparent electrode side of the photoconductive material under the application of 700 V for 0.1 sec between the two electrodes, thereby forming an electrostatic latent image on the medium. Thereafter, the medium formed with the electrostatic latent image was disposed face-to-face with an aluminum plate across an air gap defined by a spacer comprising a polyester film of 3.5 μm. This was heated for 3 minutes in an oven at 60° C. Thus, it was possible to obtain a frost image of dimple patterns with a large depth.

EXAMPLE 11

The medium obtained in Example 8 and an organic photoconductive material stacked on a transparent electrode were disposed face-to-face with each other across an air gap defined by a spacer comprising a polyester film of 9 μm. Next, image exposure was effected by projecting an image from the transparent electrode side of the photoconductive material under the application of 700 V for 0.1 sec between the two electrodes, thereby forming an electrostatic latent image on the medium. Thereafter, the medium formed with the electrostatic latent image was disposed face-to-face with the medium which was obtained in Example 9 and coronacharged to 200 V across an air gap defined by a spacer comprising a polyester film of 3.5 μm. This was heated for 3 minutes in an oven at 60° C. Thus, it was possible to obtain a frost image of dimple patterns with a large depth on the medium obtained in Example 8.

Thus, by disposing either an insulator or a conductor that has a predetermined potential face-to-face with a thermoplastic resin layer formed with an electrostatic charge pattern, it is possible to increase the Coulomb force acting on the electric charge on the surface of the thermoplastic resin layer and hence increase the depth of dimple patterns. In consequence, it is possible to enlarge the image density range.

FIGS. 14(a)-14(c) are views for explanation of one example of the frost image forming method according to the present invention, in which reference numeral 10 denotes a corona discharge electrode, and 11 stored electric charge.

In the present invention, first, the information recording medium 2 and the corona discharge electrode 10 are dispsosed face-to-face with each other, as shown in FIG. 14(a), and a predetermined voltage is applied between the information recording medium electrode 2b and the corona discharge electrode 10 from the power source E, thereby uniformly storing on the thermoplastic resin layer 2a electric charge 41 which is opposite in polarity to the image forming electric charge which will be generated by image exposure, and thus effecting pre-charging. This is effected by moving the corona discharge electrode 10 in a state where it faces the information recording medium 2, as shown in FIG. 14(a).

The arrangement may be such that the information recording medium 2 and an electrode 20 which is so shaped as to face the whole surface of the information recording medium 2 are disposed, as shown in FIG. 14(b), and a predetermined voltage is applied between the electrode 20 and the information recording medium electrode 2b, thereby uniformly storing electric charge on the thermoplastic resin layer 2a. It is also possible to effect charging only by the application of a voltage in the dark without performing exposure. In the case where the application of a voltage is carried out in the dark, the pre-charging can be effected with high accuracy and with a relatively simple apparatus by controlling the voltage application time and the applied voltage.

The arrangement may also be such that the photosensitive member 1 and the information recording medium 2 are disposed face-to-face with each other, as shown in FIG. 14(c), and with a predetermined voltage being applied between the electrodes 1b and 2b, overall exposure is effected from the photosensitive member side, thereby effecting charging.

Figure 15:
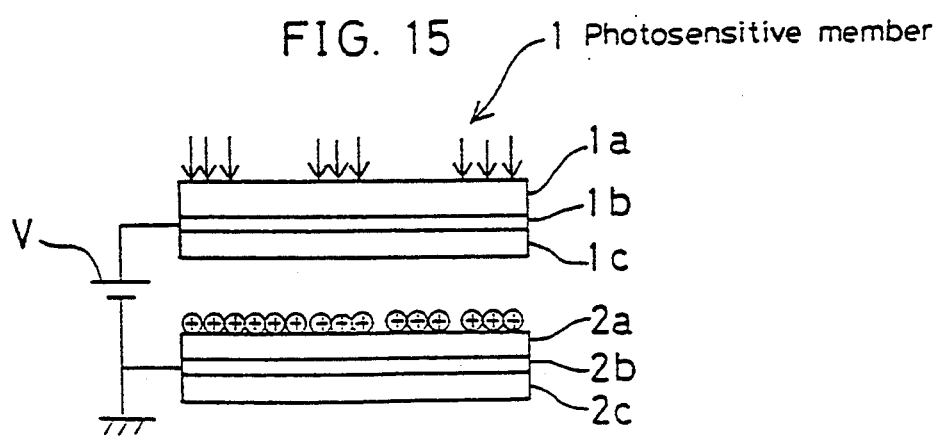

The information recording medium 2 uniformly charged in this way and the photosensitive member 1 are disposed face-to-face with each other, and image exposure is carried out with a predetermined voltage being applied between the two electrodes, as shown in FIG. 15. As a result, the exposed portions of the photoconductive layer 1c of the photosensitive member 1 become electrically conductive, so that the charges that are injected into the photoconductive layer 1c from the electrode 1b move to the surface of the photoconductive layer 1c and combine with ions dissociated in the air gap. In consequence, charges in the air gap which are opposite in polarity to the combined ions are attracted by the electric field in the air gap and stored on the thermoplastic resin layer 2a, thus image recording being effected.

In such image recording, when irradiated with light, the photosensitive member 1 can be regarded as a conductor, whereas, when no light is applied, it can be regarded as an insulator. In addition, when a voltage that exceeds a voltage that is determined by the Paschen discharge characteristics is applied to the air layer, the discharge gap can be regarded as a conductor. The information recording medium 2 may be considered to be an insulator at all times.

Figure 16:
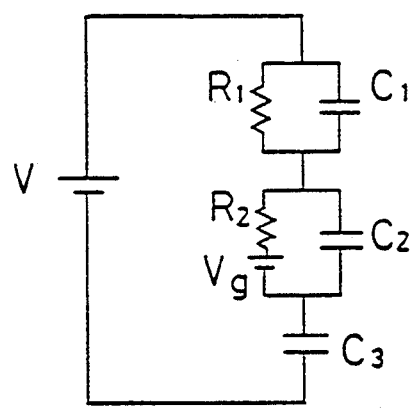
FIGS. 16(a)-16(c) are diagrams showing an equivalent circuit.
Figure 16:
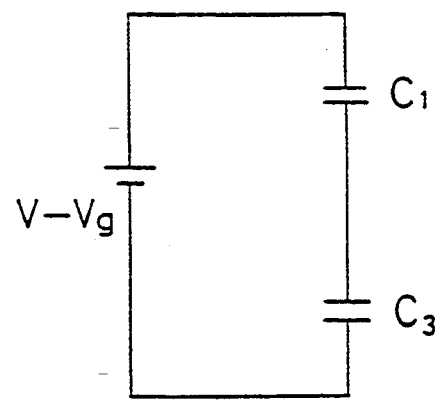
Figure 16:
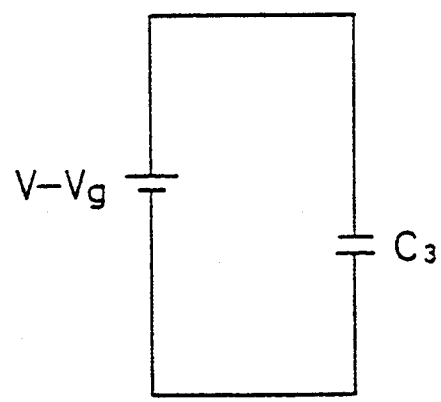

Accordingly, the system that is shown in FIG. 15 may be considered to be an equivalent circuit such as that shown in FIG. 16(a). In FIG. 16(a), V denotes a supply voltage that is applied between the photosensitive member and the information recording medium, $C_1$, $R_1$ the resistance and capacitance of the photosensitive member, $C_2$, $R_2$ the resistance and capacitance of the air layer, $V_g$ the Paschen discharge initiating voltage, and $C_3$ the capacitance of the information recording medium.

When the air gap voltage exceeds the discharge initiating voltage $V_g$, the gap voltage is saturated at $V_g$. When no light is applied and the gap voltage is in excess of the discharge initiating voltage, the equivalent circuit may be considered to be such that the supply voltage decreases by $V_g$ and the photosensitive member and the information recording medium are connected in series through the capacitances $C_1$ and $C_3$, as shown in FIG. 16(b). When light is applied from the photosensitive member side and consequently the photosensitive member becomes a conductor, it may be considered that the equivalent circuit is such as that shown in FIG. 16(c).

Assuming that the surface of the information recording medium 2 is uniformly pre-charged to a potential $V'$, the quantity of electric charge that is stored on the information recording medium 2 is given by $$Q = C_3 V' \quad (1)$$

Assuming that voltages that are distributed to the capacitances $C_1$ and $C_3$ when the gap voltage exceeds the discharge initiating voltage $V_g$ are represented by $V_1$ and $V_3$, respectively, the following simultaneous equations are valid:

$$V_1 + V_3 = V - V_g$$

$$-C_1 V_1 + C_3 V_3 = C_3 V'$$

The equations are solved as follows:

$$V_1 = C_3(V - V_g)/(C_1 + C_3)$$

$$- C_3 V'/(C_1 + C_3) \quad (2)$$

$$V_3 = C_1(V - V_g)/(C_1 + C_3)$$

$$+ C_3 V'/(C_1 + C_3) \quad (3)$$

The first term on the right side of equation (2) is a voltage that is applied to the photosensitive member in a dark state, and the second term is a voltage that is generated on the photosensitive member by the pre-charging. In equation (3), the first term on the right side is a background potential at the unexposed region, and the second term is a voltage that is generated by the pre-charging.

When the photosensitive member becomes a conductor as a result of image exposure, that is, the equivalent circuit is such as that shown in FIG. 16(c), the potential on the information recording medium is $V - V_g$ irrespective of whether pre-charging has been effected or not. Accordingly, the potential difference $\Delta V$ between the exposed and unexposed regions on the information recording medium is given by $$\begin{aligned} \Delta V &= V - V_g - V_3 \\ &= C_1(V - V_g)/(C_1 + C_3) - C_3 V'/(C_1 + C_3) \end{aligned} \quad (4)$$

It will be understood from equation (4) that $\Delta V$ varies in accordance whether $V'$ is positive or negative.

Figure 1:
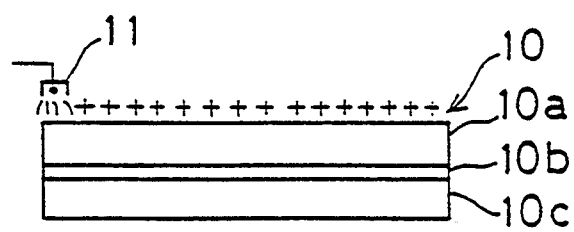
FIGS. 1(a)–1(d) are views for explanation of a conventional method of forming a frost image.
Figure 1:
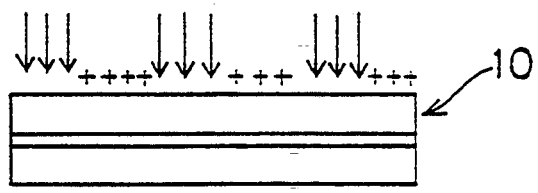
Figure 1:
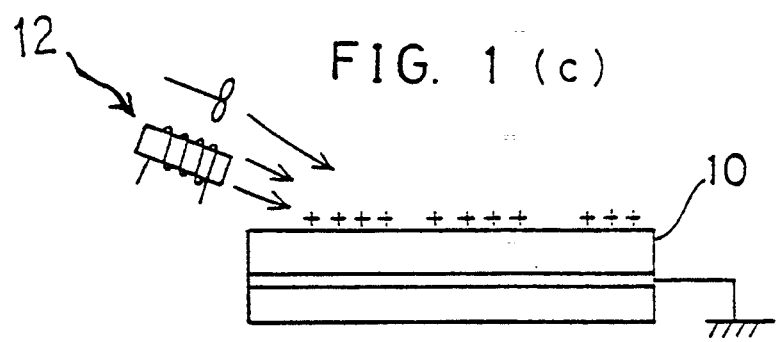
Figure 1:
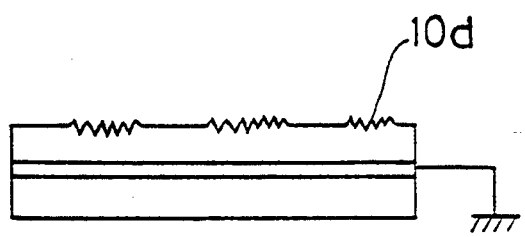
Figure 2:
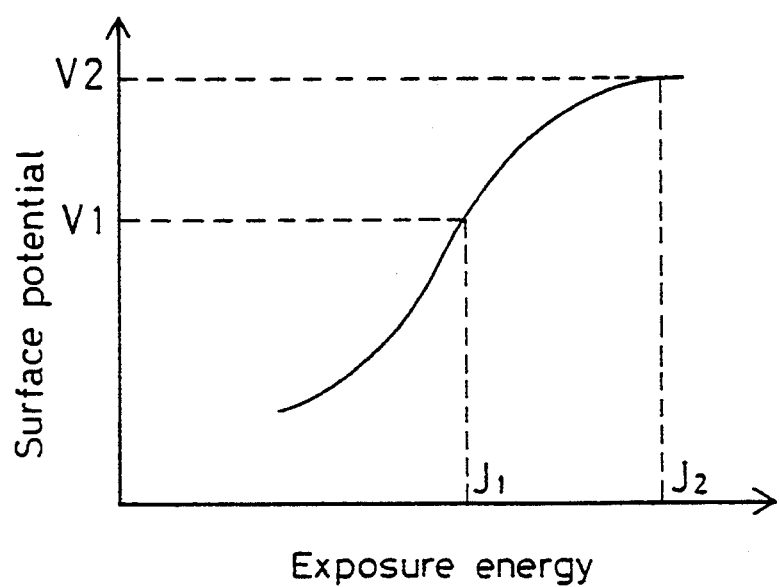
FIG. 2 shows the relationship of the surface potential to the exposure energy.
Figure 17:
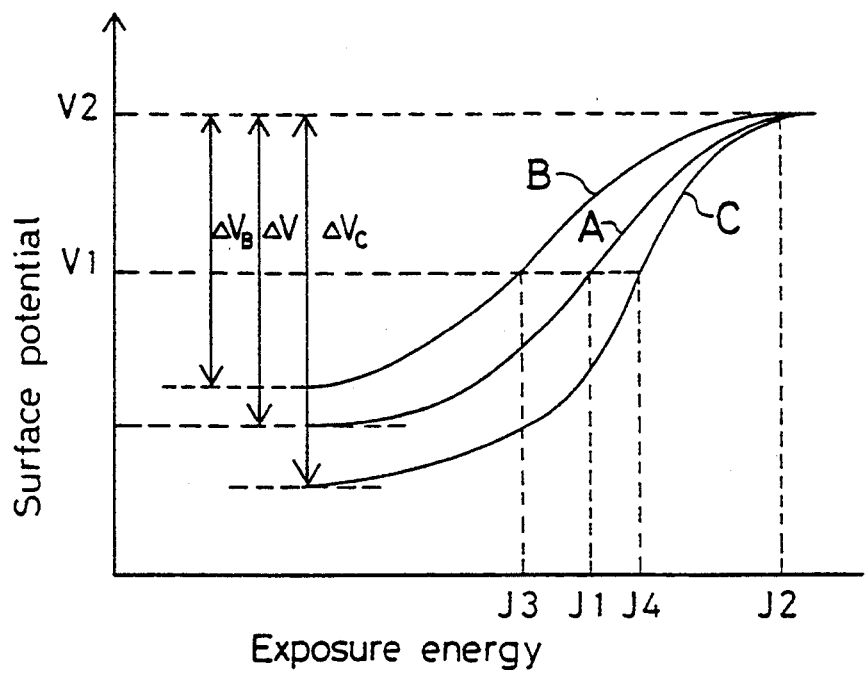
FIG. 17 is a graph showing the relationship between the exposure energy and the surface potential.

As has been described in connection with FIG. 2, the surface potential on the information recording medium has characteristics such as those shown by curve A in FIG. 17A in relation to the exposure energy.

Thus, by heating the information recording medium to form dimple patterns thereon under conditions that satisfy the following requirements:

$$V1 \leq \text{surface potential}(V) \leq V2$$

$$J1 \leq \text{exposure energy}(J) \leq J2$$

and then cooling it to fix the dimple patterns, it is possible to obtain a frost image with tonal reproducibility.

In the meantime, if the electric charge that is stored by pre-charging has the same polarity as that of the electric charge formed by image exposure, $V'$ is positive, so that $\Delta V$ decreases to $\Delta V_B$, as will be understood from equation (4). This means that the potential at a portion where the exposure energy is small is raised by $C_3 V'/(C_1 + C_3)$ in equation (3). In consequence, the surface potential varies in relation to the exposure energy as shown by the characteristic curve B, so that the region where a frost image can be formed widens to the range of from J3 to J2, thus enabling the tonal reproducibility to be increased.

On the other hand, if the electric charge that is stored by pre-charging is opposite in polarity to the electric charge formed by image exposure, $V'$ is negative, so that $\Delta V$ increases to $\Delta V_C$, as will be understood from equation (4). This means that the potential at a portion where the exposure energy is small lowers by $C_3 V'/(C_1 + C_3)$ in equation (3). In consequence, the surface potential varies in relation to the exposure energy as shown by the characteristic curve C, so that the region where a frost image can be formed narrows to the range of from J4 to J1. If the characteristic curve is steepened by controlling the quantity of electric charge stored by pre-charging, it is possible to form a frost image in a binary manner with J4 defined as a threshold value.

Thus, it is possible to set tonal reproducibility as desired by controlling the polarity and quantity of electric charge stored by pre-charging.

Although in the foregoing the pre-charging is uniformly effected, it should be noted that, if the pre-charging is effected in a pattern, the tonal reproducibility of the frost image can be obtained in the pattern form. By effecting pre-charging in a pattern, it is possible to effect image processing, e.g., masking or enhancement.

Figure 18A:
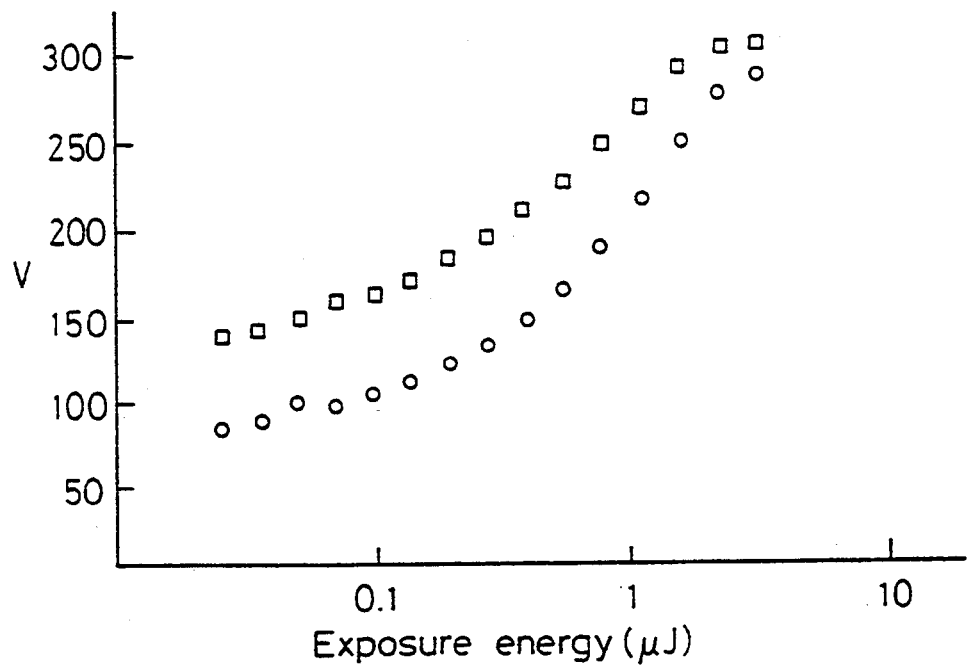
FIGS. 18(a)-18(d) are graphs showing the relationship of the measured data about the surface potential and the light absorption to the exposure energy.
Figure 18B:
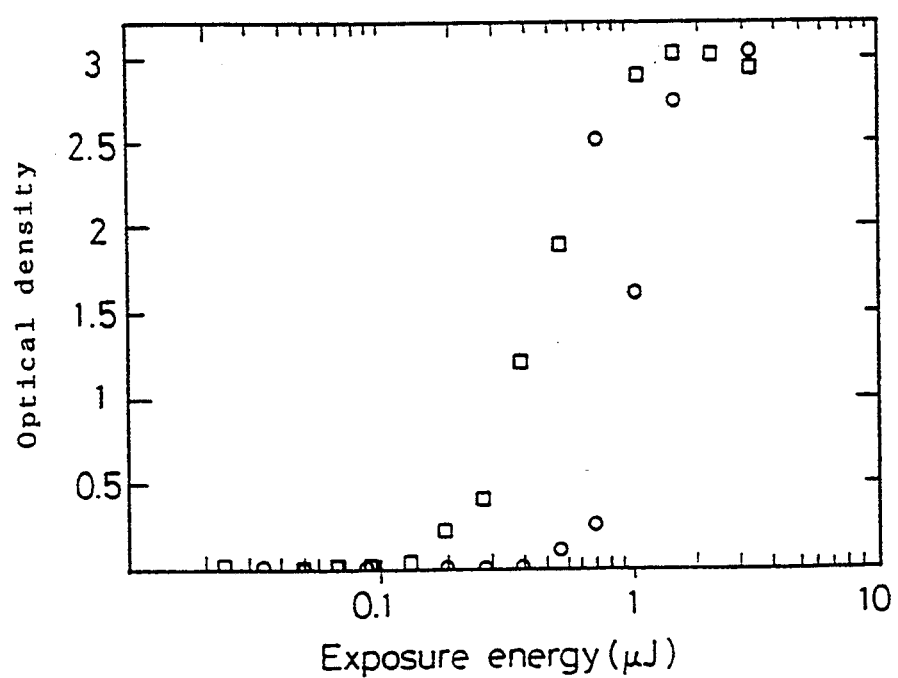

As one example of the above method, a 40 wt % solution, which was prepared by dissolving 20 g of Pentalin AJA (Rika Hercules Co.) in 30 g of monochlorobenzene, was coated on a 1 mm glass substrate having Al evaporated thereon by use of a spin coater at 2000 rpm to a film thickness of 3.2 $\mu$m, thereby forming a methid. With a photosensitive member disposed face-to-face with this medium across an air gap of 9 $\mu$m, projection exposure of a gray scale was effected with 750 V being applied for 0.1 sec between the respective electrodes of the glass substrate and the photosensitive member, and the surface potential was measured with a vibrating-type surface potential measuring device. The mark o in FIG. 18(a) shows the results of the measurement. The glass substrate was heated for 3 minutes in an oven at 80° C. to form a frost image, and the reflection absorbance was measured by used of a microdensitometer (Konika). As a result, light absorption characteristics as shown by the mark o in FIG. 18(b) were obtained. A region where the light absorption is large, the depth of the frost dimple pattern is large and the irregular reflection is large.

Further, with a photosensitive member employed, the above glass substrate was uniformly pre-charged to +70 V by application of 750 V for 0.1 sec in the dark. Thereafter, projection exposure of a gray scale was effected and the surface potential was measured in the same way as the above, thus obtaining results indicated by the mark □ in FIG. 18(a). The glass substrate was then heated in an oven to form a frost image, and the reflection absorbance was measured by use of a microdensitometer. As a result, light absorption characteristics as shown by the mark □ in FIG. 18(b) were obtained.

As will be understood from the figures, if the information recording medium is stored with electric charge of the same polarity as that of the image electric charge by pre-charging, the slope of the surface potential relative to the exposure energy becomes gentle, so that it is possible to widen the exposure energy range within which a frost image can be formed and hence possible to enlarge the tonal reproducibility of the frost image.

Figure 18C:
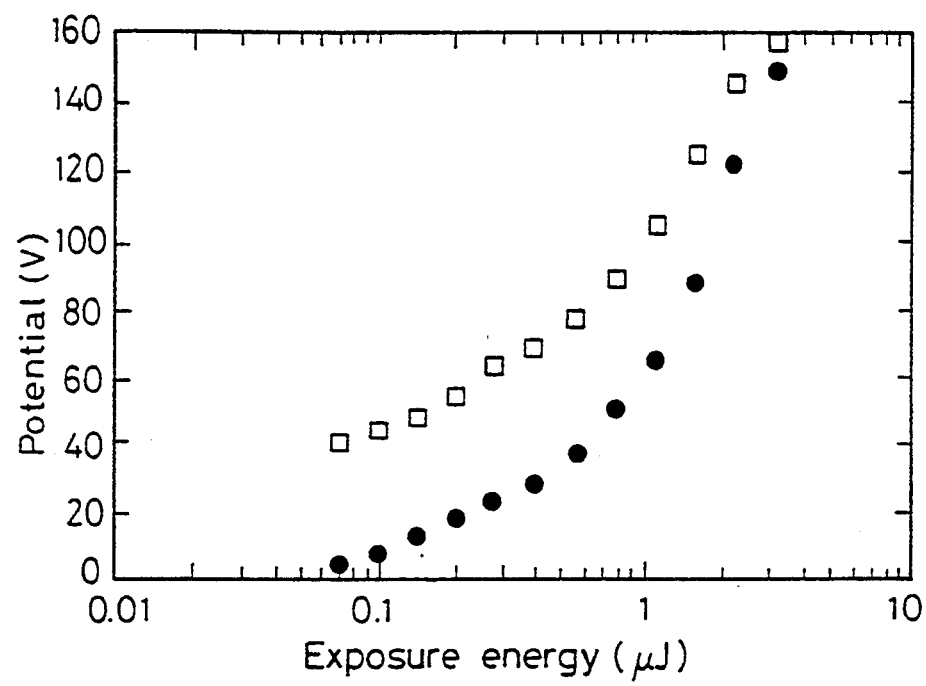
Figure 18D:
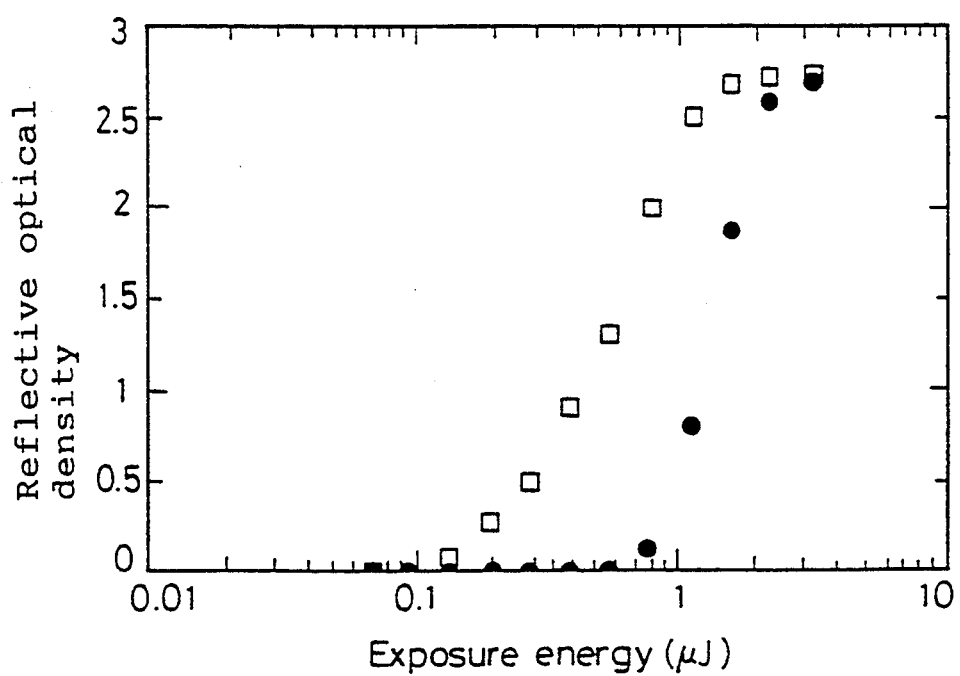

After the information recording medium was uniformly pre-charged to −40 V in the same way as the above, projection exposure of a gray scale was effected and the surface potential was measured in the same way as the above. In consequence, results as indicated by the mark ● in FIG. 18(c) were obtained. When the glass substrate was heated in an oven to form a frost image and then the reflection absorbance was measured by use of a microdensitometer, characteristics as indicated by the mark ● in FIG. 18(d) were obtained.

As will be understood from the figures, if the information recording medium is stored with electric charge opposite in polarity to the image electric charge by pre-charging, the slope of the surface potential relative to the exposure energy becomes steep, so that the frost image can be reproduced in a binary manner. As a result, it is possible to effect (0,1) digital recording or reproduction of high contrast. By effecting pre-charging, as described above, the recorded image can be modulated for image processing.

Figure 19:
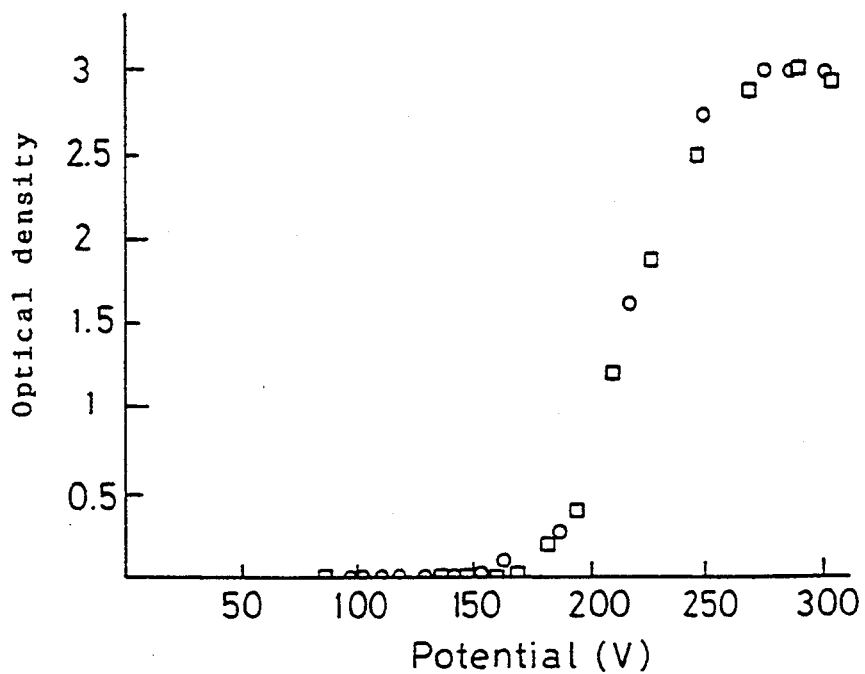
FIG. 19 is a graph showing the relationship between the surface potential and the optical density.

As will be understood from FIG. 19, in which the light absorption relative to the surface potential is plotted, no frost image can be formed at a voltage of 170 V or lower.

Thus, by storing the information recording medium with electric charge which is identical or opposite in polarity to the image electric charge by pre-charging in advance of the image exposure, the tonal reproducibility of the frost image can be selected as desired through the change of Y-characteristics. That is, by storing the information recording medium with electric charge of the same polarity as that of the electrostatic latent image, the tonal reproducibility can be enlarged, whereas, by storing the information recording medium with electric charge opposite in polarity to the electrostatic latent image, it is possible to form a frost image in a binary manner.

As has been described in connection with FIGS. 1(a)–1(d), when the information recording medium 2 formed with an electrostatic charge pattern is placed on a table 30c in an oven 30, as shown exemplarily in FIG. 20, and heated, for example, for 10 minutes at 60° C. or for 5 seconds at 110° C. by use of a heater 30a and a blower 30b, the thermosoftening resin layer 2a stored with electrostatic charge softens to form a frost image. By cooling the information recording medium 2 thereafter, the dimple pattern image is fixed and recorded as information. The electrostatic charge pattern that is formed by image exposure has extremely high resolution, so that an extremely fine dimple pattern image can be formed by reducing the thickness of the thermosoftening resin layer.

Reading of the frost image formed in this way will be explained with reference to FIGS. 21(a)–21(b).

Figure 21A:
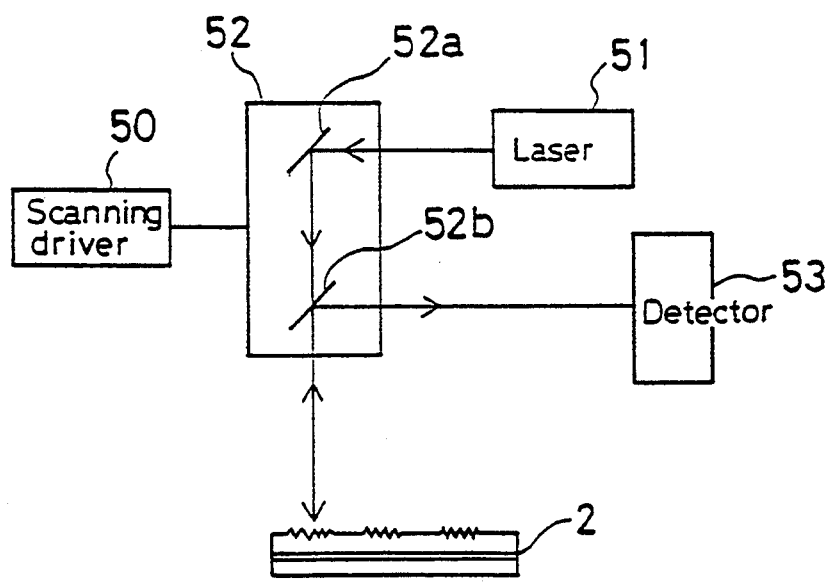
FIGS. 21(a) and 21(b) are views for explanation of the reading method according to the present invention.

In FIG. 21(a), laser light from a laser light source 51 is applied to the information recording medium surface formed with a frost image via a reflecting mirror 52a and a half-mirror 52b, and the reflected light therefrom is applied via the half-mirror 52b to a detector 53 where it is converted into an electric signal for reading. The information recording medium surface is scanned with the scanning optical system that is driven by a scanning driving device 50 to read the frost image sequentially. In this way, the frost image can be read with a resolution corresponding to the laser scanning density. In this case, a portion where a dimple pattern portion is formed causes irregular reflection and hence looks white, whereas a portion where no dimple pattern is formed transmits light and hence looks black. Accordingly, a negative image of the frost image is read.

Figure 21B:
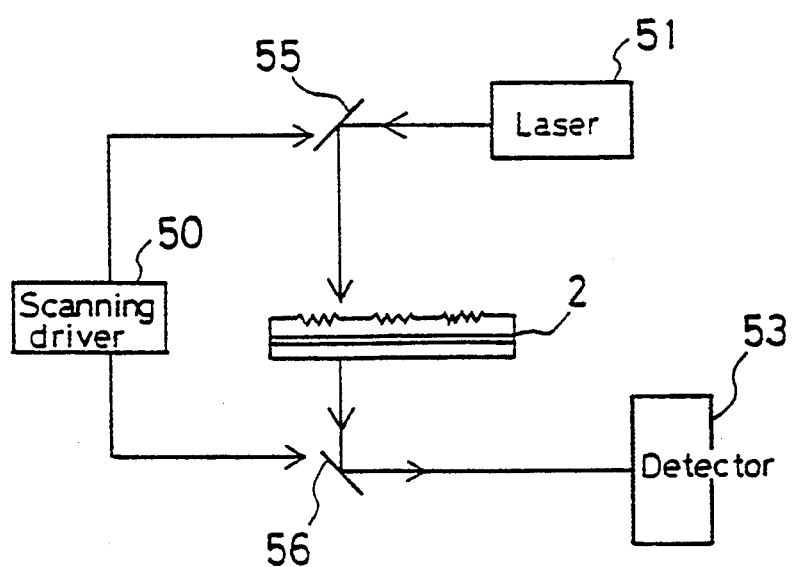

FIG. 21(b) shows an arrangement designed to read a frost image by use of transmitted light. In this case, the frost image is read with reflecting mirrors 55 and 56 being driven to scan the information recording medium surface by the scanning driving device 50. A portion where a dimple pattern is formed causes irregular reflection and transmits no light and hence looks black, whereas a portion where no dimple pattern is formed transmits light and hence looks white. Accordingly, a positive image of the frost image is read.

Thus, the frost image can be read in the form of either a positive image or a negative image depending upon whether it is read with reflected light or transmitted light.

It is therefore possible to read the frost image with high resolution by selecting either one according to need.

Figure 22:
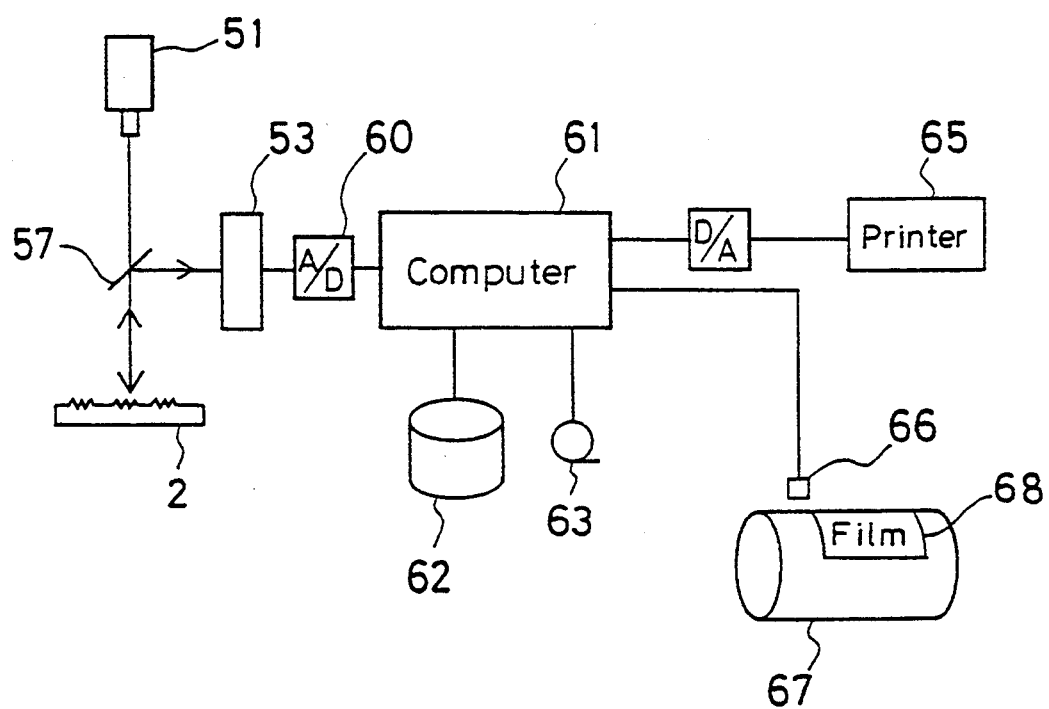
FIG. 22 shows one embodiment in which the present invention is applied to an input scanner.

FIG. 22 is a view for explanation of one embodiment in which the frost image rearing method of the present invention is applied to an input scanner.

The information recording medium 2 has a predetermined original document, for example, recorded thereon in the form of a frost image. The surface of the information recording medium 2 is scanned with laser light applied thereto from a laser light source 51 through a half-mirror 57, and the reflected light therefrom is detected and converted into an electric signal in a detector 53 and then read into a computer 61 after A/D conversion. In this case, since image data is enormous in amount, it is recorded on a magnetic disk 62 or a magnetic tape 63 in order to read a large amount of image information. When necessary, the recorded image data is read out and recorded by exposure on a film 68, set on a recording cylinder 67, through a recording head 66 with a predetermined image processing, for example, image synthesis, color correction, magnification factor conversion, masking, detail enhancement, etc., being additionally executed through observation on a monitor (not shown). It should be noted that the image data can be printed out using a printer 65, if necessary.

In this case, the information recording medium 2 formed with a frost image constitutes an input scanner of the flatbed type. There is therefore no need for a read cylinder or the like, and it is possible to make the arrangement compact and eliminate the need for a troublesome operation such as setting of an original document. In addition, the information recording medium 2 has analog information recorded thereon by surface exposure in the form of a frost image, and if this is used as a substitute for MT, it is possible to save the time required for recording to and reading from MT. It is therefore possible to reduce the total time required for the operation from the original document reading process to the exposure recording process.

Thus, by scanning the thermosoftening resin surface formed with a frost image with laser light and reading the frost image by means of transmitted light or reflected light, the frost image can be read with its high resolution being utilized by virtue of the scanning density of the laser light, and it is possible to read the frost image in the form of either a positive or negative image according to need by selecting either transmitted light or reflected light.

Figure 23:
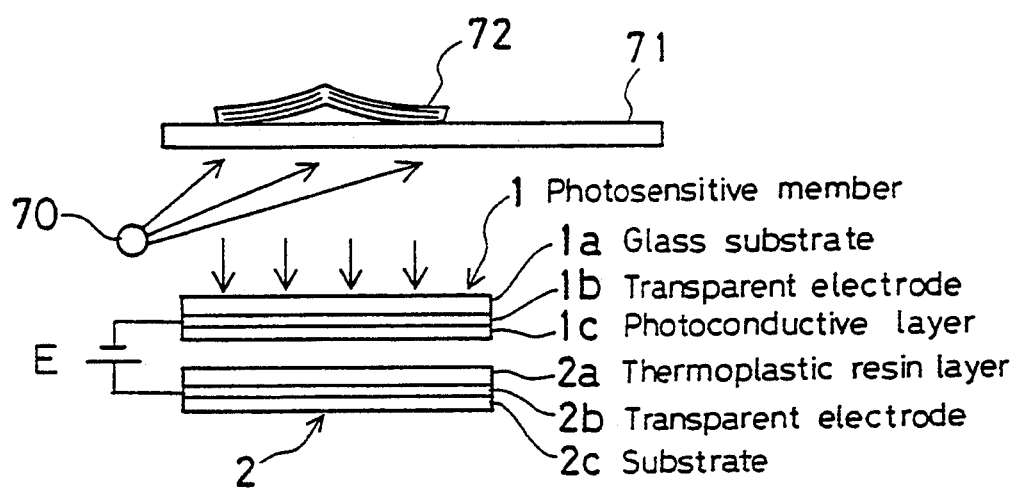
FIG. 23 is a view for explanation of the formation of an electrostatic charge image on an information recording medium.
Figure 24:
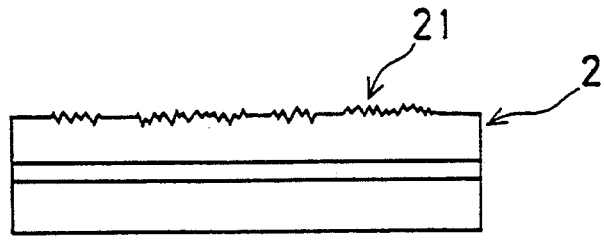
FIG. 24 is a view for explanation of an OHP original having a frost image formed thereon.

FIG. 23 is a view for explanation of the formation of an electrostatic charge image on an information recording medium, and FIG. 24 is a view for explanation of an OHP original having a frost image formed thereon. In the figures, reference numeral 2 denotes an information recording medium, 2a a thermoplastic resin layer, 2b a transparent electrode, 2c a substrate, 70 a light source, 71 a platen glass, and 72 an original document.

The photosensitive member 1 is the same as that explained in connection with FIG. 6. The information recording medium 2, having the same arrangement as that of the information recording medium shown in FIG. 6, is disposed face-to-face with the photosensitive member 1 across a gap of about 10 $\mu$m. The photosensitive member and the information recording medium are set at the lower side of the platen glass 71, and the original document 72, e.g., a book, is set on the upper surface of the platen glass 71. With a voltage being applied between the respective electrodes of the photosensitive member and the information recording medium, light is applied to the original document 72 from the lower side of the platen glass 71 by the light source 70 to expose the photosensitive member to the reflected light from the document 72. In consequence, black portions of the original document surface absorb the light and the quantity of reflect light therefrom is small, whereas white portions reflect light, so that image exposure is effected in accordance with the light and shade pattern on the document surface. As a result, the regions of the photosensitive member which are irradiated with light become electrically conductive, so that a high voltage is applied across the gap between the photosensitive member and the information recording medium, thus inducing an electric discharge. On the other hand, the regions of the photosensitive member which are not irradiated with light remain insulating. In these regions, therefore, no voltage that exceeds the discharge breakdown voltage is applied across the gap between the photosensitive member and the information recording medium and hence no electric discharge occurs. As a result, an electrostatic charge pattern corresponding to the light-shade pattern image of the original document surface is formed on the insulating information recording medium, the electrostatic charge pattern being in the form of a negative image.

Figure 20:
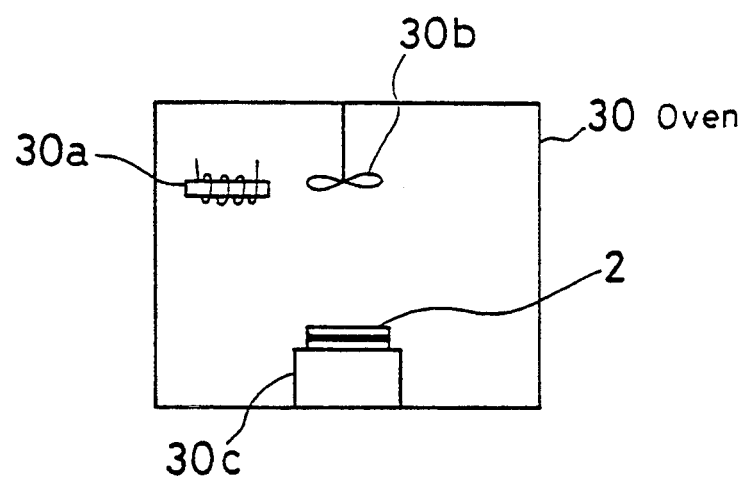
FIG. 20 is a view for explanation of thermal development.

Next, the information recording medium 2 formed with the electrostatic charge pattern is heated by use of the oven 30 shown in FIG. 20, thus plasticizing the thermoplastic resin layer 2a stored with the electrostatic charge. Since electric charge which is opposite in polarity to the electrostatic charge on the surface is induced on the electrode 2b, Coulomb force acts on the surface electrostatic charge toward the electrode 2b, causing the surface of the thermoplastic resin layer 2a to be pulled inwardly. As a result, a dimple pattern image, that is, a frost image, corresponding to the electrostatic charge pattern is formed on the plasticized resin layer surface, as shown in FIG. 24. By cooling the information recording medium, the dimple patterns are fixed and recorded as information, thus obtaining an OHP original. When light is applied to the OHP original, irregular reflection occurs at the portions where dimple patterns are formed, so that the information can be reproduced by reading whether a dimple pattern is present or not by use of the transmitted or reflected light.

For example, if light is applied to observe the transmitted light image, a portion where a frost image is formed causes irregular reflection and looks black, whereas a portion where no frost image is formed transmits the light and looks white, thus enabling observation of a positive image of the frost image, that is, a negative image of the original document. On the other hand, if light is applied to the information recording medium to observe the reflected light image, a portion where a frost image is formed causes irregular reflection and looks white, whereas a portion where no frost image is formed transmits the light and shows the background color, thus enabling observation of a negative image of the frost image, that is, a positive image of the original document. It should be noted that the electric surface charge leaks in the heating process and the greater part of it disappears.

Figure 25:
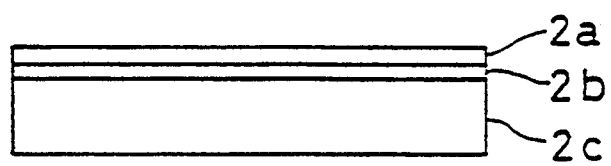
FIGS. 25(a)-25(c) are views for explanation of various kinds of information recording medium.
Figure 25:
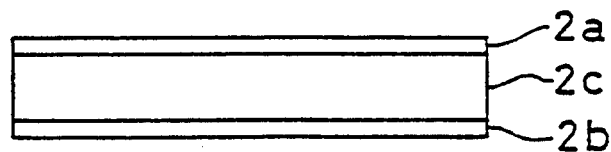
Figure 25:
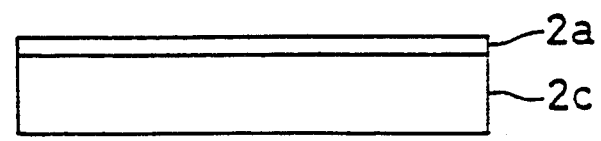

Examples of usable information recording media include an information recording medium of the type that comprises a transparent electrode layer 2b and a thermoplastic resin layer 2a, which are successively stacked on a PET substrate 2c, as shown in FIG. 25(a), an information recording medium of the type that comprises a thermoplastic resin layer 2a and the transparent electrode layer 2b, which are formed on both surfaces, respectively, of a PET substrate 2c, as shown in FIG. 25(b), and an information recording medium of the type that comprises a thermoplastic resin layer 2a which is merely formed on a PET substrate 2c, as shown in FIG. 25(c). However, the information recording medium of the type that is shown in FIG. 25(c) needs to prepare an electrode separately and apply a voltage between the photosensitive member and this electrode, which is in contact with the substrate.

Figure 26:
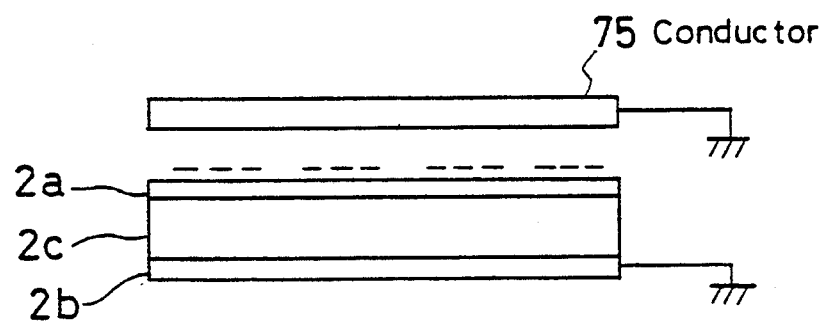
FIG. 26 is a view for explanation of a method of improving the contrast of a frost image.

Further, in the case where a film formed with an electrostatic charge pattern is heated to form a frost image thereon, the stronger the electric field acting on the electric charge on the thermoplastic resin layer, the larger the depth of the resulting dimple patterns, thus enabling the contrast being improved. Accordingly, an electrical conductor 75 is disposed face-to-face with the thermoplastic resin layer 2a formed with an electrostatic charge pattern across an air gap of 0.5 to 3 mm, and the electrode 2b and the conductor 75 are grounded, as shown in FIG. 26. In consequence, electric charge which is opposite in polarity to the image electric charge is induced on the conductor 75, so that large Coulomb force acts on the image electric charge. By heating the information recording medium in this state, a frost image with improved contrast is obtained.

Figure 27:
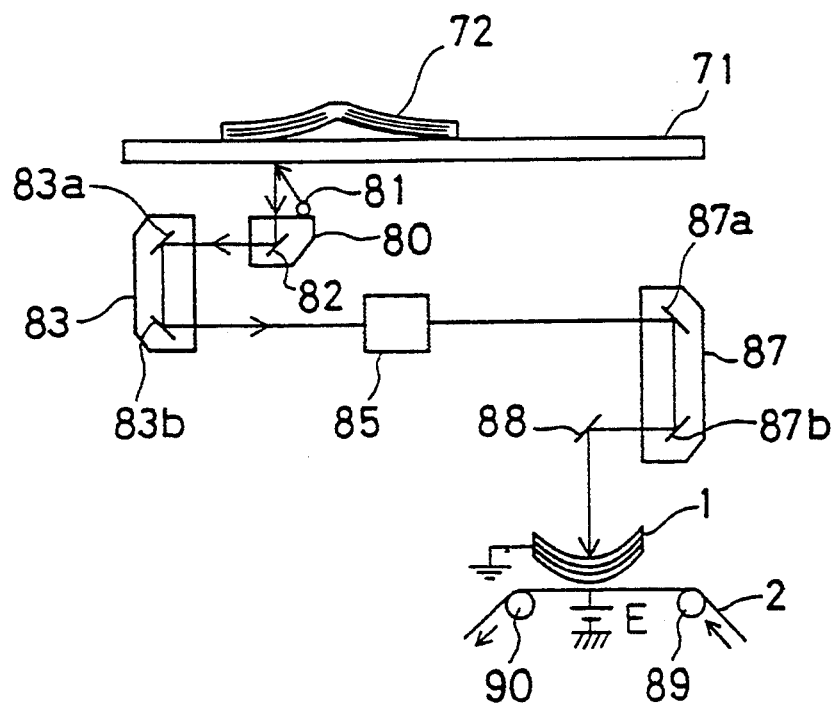
FIG. 27 shows one embodiment that employs an eaves trough-shaped photosensitive member.

FIG. 27 shows one embodiment of the present invention that uses an eaves trough-shaped photosensitive member. In the figure, the same reference numerals as those in FIG. 23 denote the same contents. It should be noted that reference numeral 80 denotes an illuminating optical system, 81 a slit light source, 82 a reflecting mirror, 83 a reflecting optical system, 83a, 83b reflecting mirrors, 85 a lens, 87 a reflecting optical system, 87a, 87b reflecting mirrors, 88 a reflecting mirror, and 89, 90 feed rollers.

This embodiment is designed so that an original document, for example, a book, is reproduced on an information recording medium by utilizing an exposure system of a copying machine.

The original document 72, e.g., a book, is set on the platen glass 71, and the lower surface of the platen glass 71 is vertically scanned with light by an illuminating optical system having the slit light source 81 and the reflecting mirror 82, which are elongated in the horizontal scanning direction, and the reflected light therefrom is passed via the reflecting optical system 83, the mirror 85, the reflecting optical system 87 and the reflecting mirror 88 to expose the photosensitive member 1. The photosensitive member 1 is elongated in the horizontal scanning direction in correspondence to the slit light source. The surface of the photosensitive member 1 that faces the information recording medium 2 is in the form of a convex surface with a cylindrical or paraboloidal shape, as illustrated. The information recording medium 2, for example, one such as that shown in FIG. 25(b), is fed by the feed rollers 89 and 90 synchronously with the vertical scanning effected by the illuminating optical system 80, in opposing relation to the photosensitive member 1. As a result, an electric discharge occurs in the vicinity of a region where the photosensitive member and the information recording medium 2 are closest to each other, causing a linear electrostatic charge pattern to be formed. As the information recording medium 2 is fed in synchronism with the illuminating optical system, electrostatic charge patterns corresponding to the image of the original document are successively formed on the information recording medium 2. By heating this film, a frost image can be formed.

In this embodiment, the photosensitive member has a convex surface which is formed so that the voltage across the gap exceeds the discharge breakdown voltage only at a region where the photosensitive member and the film are closest to each other, thereby making it possible to prevent the occurrence of an electric discharge at other exposed regions. It is therefore possible to prevent imaging of the background, that is, fogging.

Figure 28:
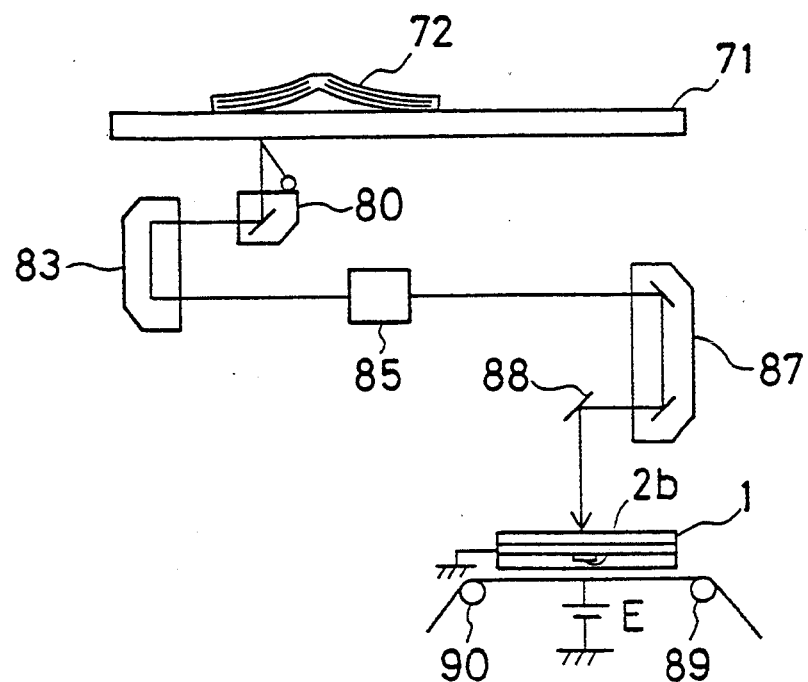
FIG. 28 shows one embodiment that employs a slit-shaped photosensitive member.

FIG. 28 shows one embodiment that employs a slit-shaped photosensitive member, in which the same reference numerals as those in FIG. 27 denote the same contents.

This embodiment is the same as the embodiment shown in FIG. 27 except for the arrangement of the photosensitive member 1. The photosensitive member 1 has a transparent electrode 2b which is elongated in the horizontal scanning direction in correspondence to a slit light source 81, with a width of 1 mm. Since exposure is effected by applying a voltage to this portion only, it is possible to prevent the fogging phenomenon at an area other than the exposed areas in the same way as in the case of FIG. 27.

Figure 29:
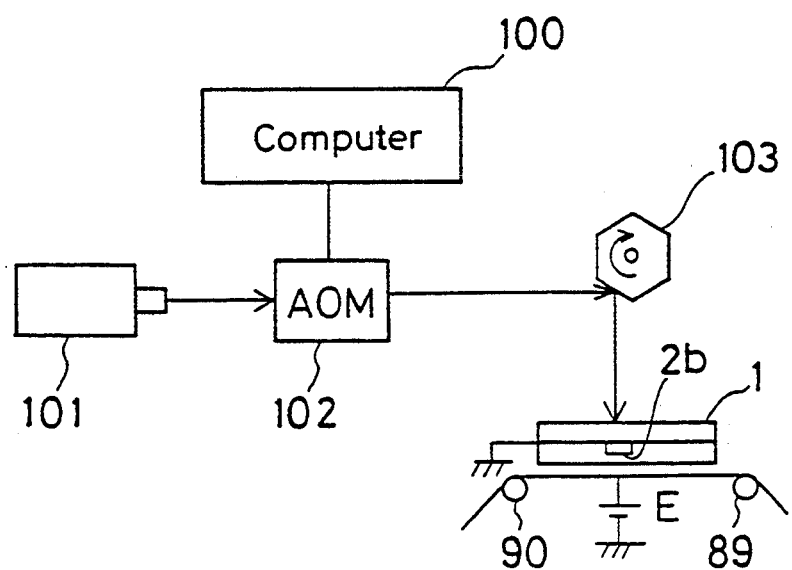
FIG. 29 shows one embodiment in which the present invention is applied to a printer.

FIG. 29 shows another embodiment in which the present invention is applied to a printer. In the figure, reference numeral 100 denotes a computer, 101 a laser light source, 102 an acoutooptic modulator (AOM), and 103 a polygon mirror.

In this embodiment, laser light from the laser light source 101 is modulated by data stored in the computer through the AOM 102 to effect slit exposure while scanning is being effected in the horizontal scanning direction by the polygon mirror 103, with the information recording medium 2 being transported in the vertical scanning direction, thereby forming a linear electrostatic charge pattern on the information recording medium 2.

Since this embodiment enables an OHP original to be made directly from the data stored in the computer, it becomes unnecessary to print out the computer data and it is therefore possible to improve the efficiency of the operation of making an OHP original.

Thus, since an OHP original is made by forming an electrostatic charge image directly on a thermoplastic information recording medium and then heating the medium to form a frost image thereon, toner development is not needed and an OHP original of extremely high resolution can be made. In addition, since the depth of dimple patterns constituting a frost image varies in accordance with the quantity of exposure energy, tonal reproducibility can be provided. In particular, when this embodiment is applied to a printer, it is possible to make an OHP original directly from the computer data.

Figure 30:
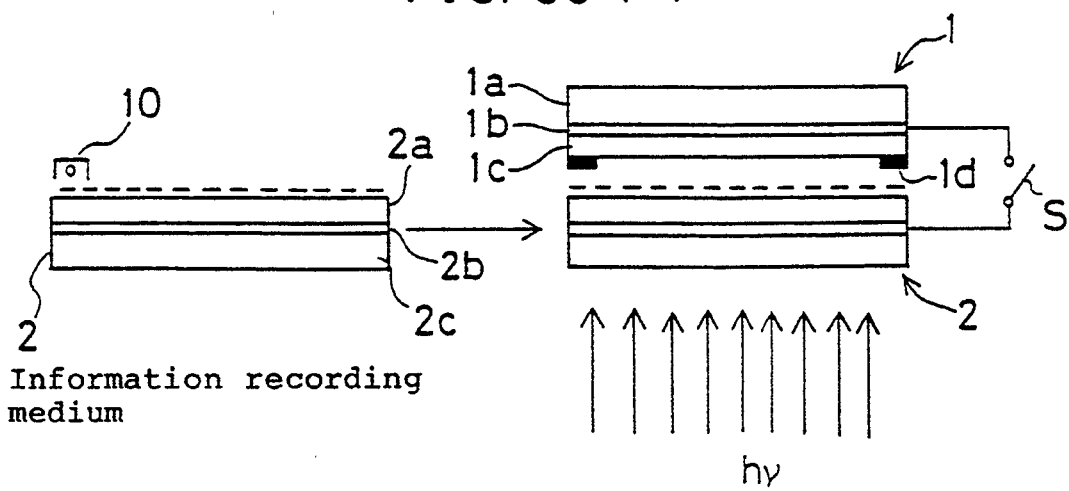
FIGS. 30(a) and 30(b) are views for explanation of an image forming method.
Figure 30:
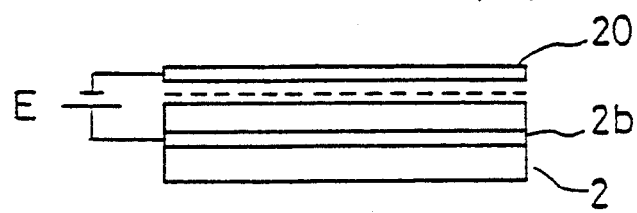
Figure 31:
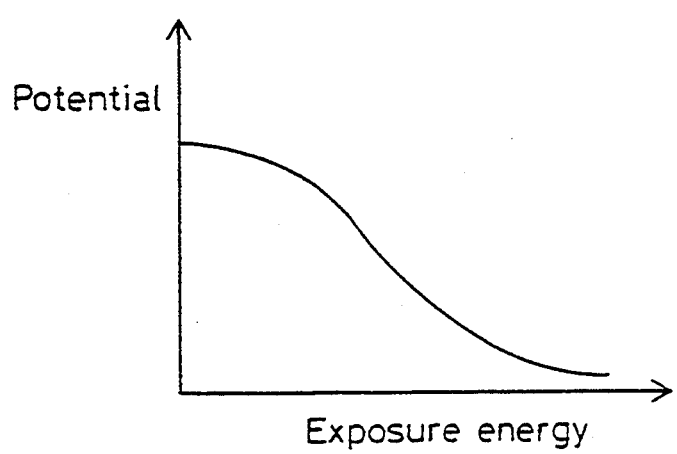
FIG. 31 is a graph showing the relationship between the exposure energy and the surface potential of the information recording medium.

FIGS. 30(a) and 30(b) are views for explanation of an image forming method, and FIG. 31 is a graph showing the relationship between the exposure energy and the potential. In the figures, reference numeral 1 denotes a photosensitive member, 1a a photoconductive layer substrate, 1b a photosensitive member electrode, 1c a photoconductive layer, 1d an insulating spacer, 2 an information recording medium, 2a an insulating layer, 2b an information recording medium electrode, 2c an insulating layer substrate, 10 a corona wire electrode, 20 a flat plate-shaped or rod-shaped electrode, E a power supply, and S a switch.

The information recording medium 2 comprises the insulating layer substrate 2c made of glass with a thickness of 1 mm, the transparent ITO electrode 2b evaporated thereon to a thickness of 1000 Å, and the insulating layer 2a formed on the electrode 2b to a thickness of 10 μm. The photosensitive member 1 comprises the photoconductive layer substrate 1a made of glass with a thickness of 1 mm, the photosensitive member electrode 1b formed thereon from Al to a thickness of 1000 Å, the photoconductive layer 1c formed on the electrode 1b to a thickness of about 10 μm, and the polyester film spacer 1d formed on the photoconductive layer 1c to a thickness of about 10 μm. Accordingly, the photosensitive member and the information recording medium are disposed face-to-face with each other across an air gap of about 10 μm.

Figure 14:
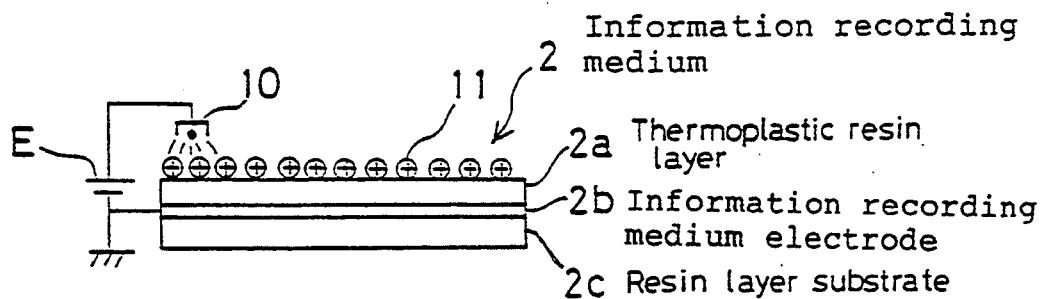
FIGS. 14(a)-14(c) and 15 show a frost image forming method.
Figure 14:
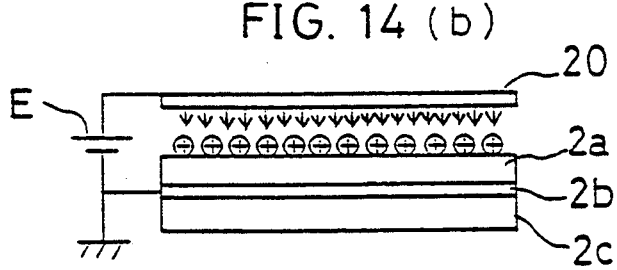
Figure 14:
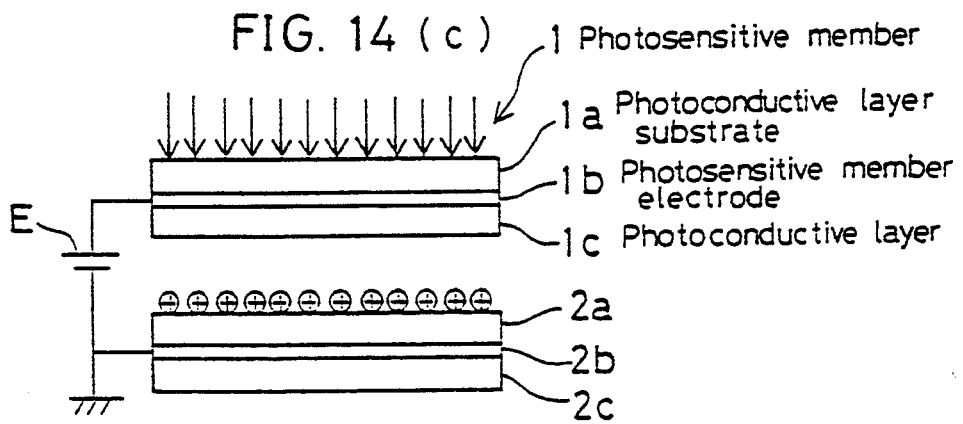

A corona discharge is induced on the information recording medium 2, for example, by applying a voltage to the corona wire electrode 10, thereby charging the insulating layer 2a to a predetermined potential, in the same way as in the description made in connection with FIG. 14. It is a matter of course that the insulating layer 2a may also be charged by disposing the electrode 20 face-to-face to the information recording medium 2 and simply applying a voltage between the two from the power supply E, as shown in FIG. 30(b). It is also possible to use other methods, for example, charging by friction, charging by peeling, corona charging, etc. In such a case, the insulating layer 2a is stored with electric charge which is opposite in polarity to the majority carriers (i.e., the type of charge carrier which can be transported more easily) in the photosensitive member. In an organic photosensitive member, the majority carriers are positive charges, whereas, in an inorganic photosensitive member, the majority carriers are either positive or negative charges in accordance with the material thereof. Therefore, if an organic photosensitive member is used, for example, the information recording medium is stored with negative charge. Next, the charged information recording medium 2 is set in opposing relation to the photosensitive member 1 across an air gap of about 10 μm, as shown in FIG. 30(a), and the switch S is closed to short-circuit the electrodes 1b and 2b with each other. Although the electrode 2b has positive charge induced thereon, which is opposite in polarity to the negative charge on the insulating layer surface, since the electrode 2b is short-circuited with the photosensitive member electrode 1b, a part of the charge is distributed to the electrode 1b, resulting in a predetermined voltage difference between the information recording medium and the photosensitive member. If image exposure is effected, for example, from the information recording medium side in this state, carriers are generated in the photoconductive layer 1c, and positive charge is transported by being drawn toward the surface of the information recording medium. Then, the positive charge combines with the ionized negative charge in the air gap at the photoconductive layer surface, thus neutralizing negative charge. As a result, the ionized positive charge in the air gap is drawn toward the information recording medium to neutralize the negative charge on the insulating layer surface. Since the quantity of positive charge that neutralizes the negative charge on the insulating layer corresponds to the quantity of exposure energy, the potential on the insulating layer surface relative to the exposure energy is such as that shown in FIG. 31. Thus, the potential on the insulating layer surface corresponds to the image and this means that the insulating layer surface has an electrostatic latent image formed thereon. In this case, a region where the quantity of exposure energy is relatively large has a relatively low potential and therefore attracts less toner in the case of toner development, for example, so that the image that is obtained by this image forming method is a positive image. It should be noted that, when the switch is off, even if exposure is effected, transport of the majority carriers will not occur; therefore no latent image is formed. Thus, a shutter operation can be performed by turning on/off the switch. In addition, since during the exposure there is no injection of energy except for the light for image exposure, it is possible to attain a noiseless, high-quality image.

Figure 32:
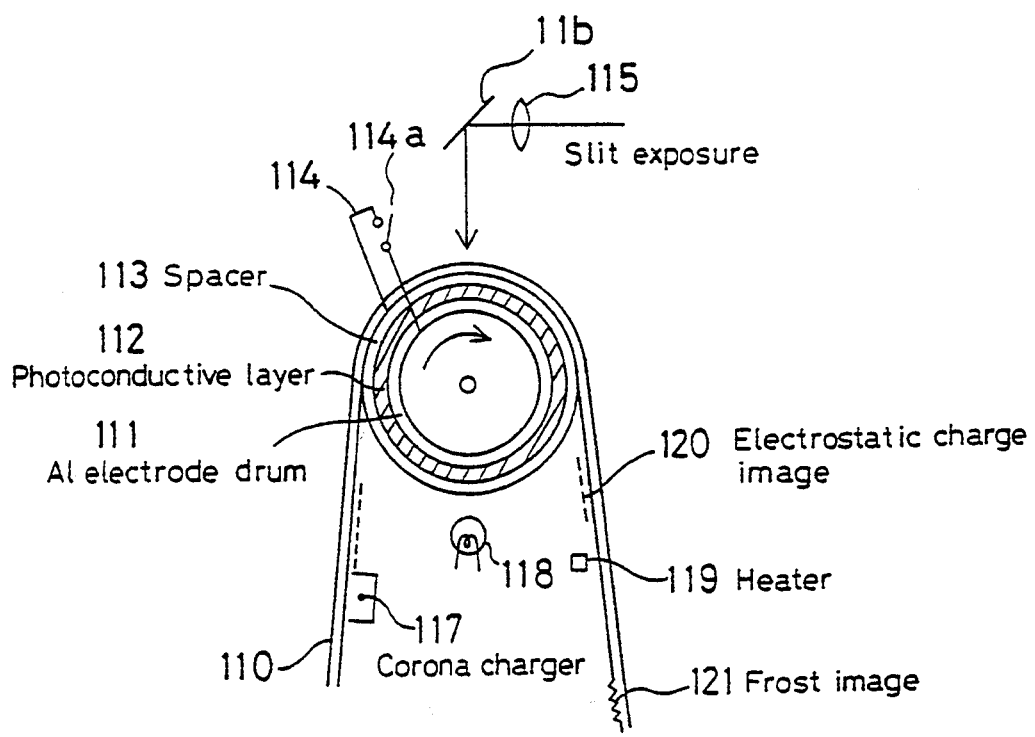
FIGS. 32(a)-32(h) show an embodiment of the apparatus for making an original for an overhead projector and particular information recording media.
Figure 32:
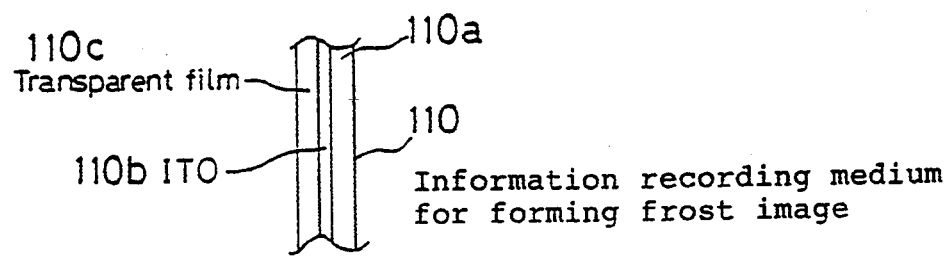

FIG. 32(a) shows one embodiment of the apparatus for making an original for an overhead projector. In the figure, reference numeral 110 denotes an information recording medium for forming a frost image, 110a a thermoplastic resin layer, 110b a transparent electrode, 110c a transparent film, 110d a stripe color filter, 110e a three-section color filter, 111 an Al electrode drum, 112 a photoconductive layer, 113 a spacer, 114 a short-circuiting means, 114a an on/off switch, 115 an imaging lens, 116 a reflecting mirror, 117 a corona charger, 118 an erasing light source, 119 a heater, 120 an electrostatic charge information, and 121 a frost image.

The information recording medium 110 for forming a frost image comprises the transparent film 110c, ITO that is evaporated thereon, and the thermoplastic resin layer stacked on the ITO, as shown in FIG. 32(b). The medium 110 is sequentially fed either continuously or intermittently by a feed means (not shown), wound around the drum-shaped photosensitive member and taken up by a take-up means (not shown), as shown in FIG. 32(a). The drum-shaped photosensitive member comprises the Al electrode drum 111, and the photoconductive layer 112 and the transparent or colored or opaque insulating spacer 113, which are successively stacked on the electrode drum 111. The information recording medium 110 is fed with the thermoplastic resin layer 110a facing the drum. The thermoplastic resin layer 110a has previously been charged to a predetermined potential by the corona charger 117. The ITO 110b and the Al electrode 111 are short-circuited with each other by closing the on/off switch 114a of the short-circuiting means 114, and slit exposure is effected through the imaging lens 115 and via the reflecting mirror 116. Other exposure method, for example, beam scanning exposure, may also be employed, as a matter of course. By this exposure process, a positive electrostatic latent image 120 is formed on the information recording medium. By heating the medium with the heater 119, a dimple pattern image is formed, and then the medium is cooled to fix the dimple patterns, thereby obtaining a positive dimple pattern image. It should be noted that, as a result of the exposure, electric charge which is opposite in polarity to the information recording medium remains on the photosensitive member, which would cause a ghost image; therefore, it is preferable to illuminate the photosensitive member with the erasing light source that comprises a line-type light-emitting diode, for example, which emits light of the wavelength to which the photosensitive member is sensitive, or to erase the residual image by AC corona, for example.

Although the foregoing is one embodiment of the OHP original making system that utilizes a frost image, it is also possible to arrange a microfilm system by utilizing this system. In such a case, the exposure section 115 and 116 in FIG. 32(a) is designed to reduce the original document to a microfilm size when imaging it, but the basic arrangement may be the same as that of the OHP original making system.

In addition, a slide making apparatus can be similarly arranged; in this case, the lens system need not be so complicated as is in the microfilm system.

These systems can be arranged to cope with the demand for color images. In that case, the photosensitive member is required to have color sensitivity. More specifically, in the case of an organic photosensitive member, RGB spectral sensitivity can be provided by use of a mixed system, e.g., pigment, dye, etc.; in the case of an inorganic photosensitive member, for example, a-Se, red sensitivity can be provided by doping Te, As, etc.; and in the case of an inorganic photosensitive member, for example, a-Si, red sensitivity can be provided similarly by doping C, for example. In this way, full-color sensitivity can be provided.

Meantime, as shown in FIGS. 32(c) to 32(h), either the stripe color filter 110d or the three-section color filter 110e is provided on the back of the transparent film 110c (FIGS. 32(c) and 32(f)), or between the ITO electrode 110b and the film 110c (FIGS. 32(d) and 32(g)), or between the ITO electrode 110b and the thermoplastic resin layer 110a (FIGS. 32(e) and 32(h)). In a case where the color filter is a stripe filter or a mosaic filter, image formation and reproduction can be effected by one-shot color exposure. In the case of a three-section color filter, a one-shot image is subjected to exposure for each of the three divided sections to obtain three exposed frames, which are superposed one upon another at the time of reproduction to form a color image.

Thus, the information recording medium having the thermoplastic resin layer is charged in advance, and this information recording medium is sequentially fed to the drum-shaped photosensitive member, and when image exposure is effected, the respective electrodes of the information recording medium and the photosensitive member are short-circuited with each other, whereby it is possible to obtain a positive frost image and hence possible to obtain a positive OHP original, microfilm and transmission slidefilm with ease.

Industrial Applicability

The present invention, which enables a clear and tonal frost image to be readily obtained, can be applied to various fields, for example, OHP original, microfilm, transmission slidefilm, etc.

What is claimed is:

1. An information recording medium comprising a pinene polymer recording insulating layer having a molecular weight of 500 to 10000, which is stacked on an electrode in face-to-face contact therewith, wherein, after an information electric charge distribution of a fine spatial resolution is stored on the surface of said recording layer, said pinene polymer is heated or left in a solvent vapor, thereby forming a frost-shaped visible image corresponding to said information electric charge on the surface of said recording layer.

2. An information recording medium according to claim 1, wherein said information electric charge is stored by means of exposure that is carried out under the application of a voltage with said medium being disposed face-to-face with a photosensitive member having an electrode.

3. An information recording medium according to claim 1, wherein said electrode is a silicon substrate having been subjected to thermal oxidation.

4. In combination, an information recording medium comprising a pinene polymer recording layer having a molecular weight of 500 to 10000, which is stacked on a primary electrode in face-to-face contact therewith, a photosensitive member comprising a layer of photoconductive material and a secondary electrode, said photosensitive member being disposed with the photoconductive layer in face-to-face spaced relationship with said pinene polymer recording layer, whereby when the secondary electrode is at a predetermined voltage potential relative to said primary electrode and the photoconductive layer is imagewise exposed to optical energy, charge is displaced from the secondary electrode onto the pinene polymer recording layer at regions corresponding to regions of said photoconductive layer that are exposed.

* * * * *